United States Patent
Lynch

(10) Patent No.: US 9,196,086 B2
(45) Date of Patent: Nov. 24, 2015

(54) METHOD, SYSTEM, AND COMPUTER-READABLE DATA STORAGE DEVICE FOR CREATING AND DISPLAYING THREE-DIMENSIONAL FEATURES ON AN ELECTRONIC MAP DISPLAY

(75) Inventor: James D. Lynch, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 1246 days.

(21) Appl. No.: 13/093,981

(22) Filed: Apr. 26, 2011

(65) Prior Publication Data

US 2012/0274625 A1 Nov. 1, 2012

(51) Int. Cl.
*G06T 17/05* (2011.01)
*G01C 21/36* (2006.01)
*G09B 29/12* (2006.01)

(52) U.S. Cl.
CPC ............ *G06T 17/05* (2013.01); *G01C 21/3638* (2013.01); *G09B 29/12* (2013.01); *G06T 2210/61* (2013.01)

(58) Field of Classification Search
CPC ............... G06T 15/04; G01C 21/3638; G01C 21/3667; G01C 21/3644; G05B 2219/36513
USPC ........................................................ 345/419
See application file for complete search history.

(56) References Cited

U.S. PATENT DOCUMENTS

| | | | |
|---|---|---|---|
| 5,918,232 A | | 6/1999 | Pouschine et al. |
| 6,157,747 A | * | 12/2000 | Szeliski et al. ................ 382/284 |
| 6,526,352 B1 | | 2/2003 | Breed et al. |
| 6,734,849 B2 | | 5/2004 | Dimsdale et al. |
| 6,847,462 B1 | | 1/2005 | Kacyra et al. |
| 6,954,202 B2 | | 10/2005 | Han et al. |
| 6,954,203 B2 | | 10/2005 | Perry et al. |
| 6,982,710 B2 | | 1/2006 | Salomie |
| 7,181,450 B2 | | 2/2007 | Malloy et al. |
| 7,184,036 B2 | | 2/2007 | Dimsdale et al. |
| 7,215,430 B2 | | 5/2007 | Kacyra et al. |
| 7,376,510 B1 | | 5/2008 | Green |
| 7,538,764 B2 | | 5/2009 | Salomie |
| 7,571,192 B2 | | 8/2009 | Gupta et al. |
| 7,610,294 B2 | | 10/2009 | Borgsmidt |
| 7,707,143 B2 | | 4/2010 | Bruce et al. |

(Continued)

OTHER PUBLICATIONS

Zheng, Jiang Yu, Yu Zhou, and Panayiotis Mili. "Scanning scene tunnel for city traversing." Visualization and Computer Graphics, IEEE Transactions on 12.2 (2006): 155-167.*

(Continued)

*Primary Examiner* — Daniel Hajnik
(74) *Attorney, Agent, or Firm* — Lempia Summerfield Katz LLC

(57) ABSTRACT

Methods, systems, and computer-readable data storage devices for generating and/or displaying a map with three-dimensional (3D) features are disclosed. For example, a method may comprise (i) defining a plurality of major three-dimensional regions ("major 3DRs") and associating each major 3DR with a respective geographical area defined for a map stored in a computer-readable map database, and (ii) displaying, via a display device, one or more of the major 3DRs upon the map. Each major 3DR comprises a top, a bottom, and multiple sides. Each top, bottom, and side of each major 3DR comprises at least one surface. At least one surface of each major 3DR being displayed is textured with an image captured via an imaging device. The image textured onto each surface comprises an image captured by the imaging device when capturing images in a direction of that surface.

22 Claims, 22 Drawing Sheets

(56) References Cited

U.S. PATENT DOCUMENTS

| | | |
|---|---|---|
| 7,716,167 B2 | 5/2010 | Colossi et al. |
| 2005/0134710 A1* | 6/2005 | Nomura et al. .......... 348/240.99 |
| 2006/0002590 A1* | 1/2006 | Borak ........................... 382/104 |
| 2006/0061566 A1* | 3/2006 | Verma et al. ................... 345/419 |
| 2007/0025624 A1* | 2/2007 | Baumberg .................... 382/232 |
| 2008/0043020 A1* | 2/2008 | Snow et al. ................... 345/427 |
| 2008/0152216 A1 | 6/2008 | Meadow et al. |
| 2009/0109216 A1* | 4/2009 | Uetabira ....................... 345/419 |
| 2010/0125812 A1 | 5/2010 | Hartman et al. |
| 2010/0209013 A1 | 8/2010 | Minear et al. |
| 2011/0164029 A1* | 7/2011 | King et al. ..................... 345/419 |

OTHER PUBLICATIONS

Street View: Explore the world at street level. Google maps. http://maps.google.com/help/maps/streetview/ (visited on Apr. 22, 2011).

\* cited by examiner

METHOD, SYSTEM, AND COMPUTER-READABLE DATA STORAGE DEVICE FOR CREATING AND DISPLAYING THREE-DIMENSIONAL FEATURES ON AN ELECTRONIC MAP DISPLAY

BACKGROUND OF THE INVENTION

The present invention relates generally to maps, navigation, and/or data thereof, and more particularly, relates to creating and/or displaying three-dimensional features on an electronic map display.

In the past, many people relied on paper maps when navigating to their destinations. However, those same people and many others currently use electronic mapping products for navigating to their destinations as well as exploring the world around them.

Electronic mapping products may be arranged according to a variety of methods and systems. For example, map information may be presented using a perspective view. In such perspective views, the vantage point of the map image is overhead, but the viewing angle is not straight down. Instead, the viewing angle is slanted toward the ground in a direction other than straight down. Because the viewing angle is slanted, roads and other geographical features in the map image are rendered so that they appear in perspective. Although current mapping technologies may provide many useful features, there exists room for further improvements. The description that follows provides example embodiments of such improvements.

SUMMARY OF THE INVENTION

In one respect, an example embodiment may take the form of a method for displaying a map with three-dimensional features. That method may comprise (i) defining a plurality of major three-dimensional regions ("major 3DRs") and associating each major 3DR with a respective geographical area defined for a map stored in a computer-readable map database, and (ii) displaying, via a display device, one or more of the major 3DRs upon the map. Each major 3DR comprises a top, a bottom, and multiple sides. Each top, bottom, and side of each major 3DR comprises at least one surface. At least one surface of each major 3DR being displayed is textured with an image captured via an imaging device. The image textured onto each surface comprises an image captured by the imaging device when capturing images in a direction of that surface.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

I. Overview

Methods, systems, and computer-readable data storage devices for generating and/or displaying a map with three-dimensional (3D) features are disclosed. A map database is populated with data that identifies major 3D regions covering large geographical areas and minor 3D regions representing 3D objects or portions of 3D objects. The minor 3D regions can be defined based on data points, such as LIDAR data points, that indicate the presence of a 3D object. The minor 3D regions can be subdivided into multiple levels of 3D regions for displaying a more precise representation of the 3D object. The 3D regions defined by points generated from a given location may include surfaces that can be textured with images captured from the given location or from nearby locations that provide a view of the 3D object. The 3D regions can be associated with other data in the map database such as road link data and point-of-interest data.

II. Displaying Maps with Three-Dimensional Features

Figure 1:
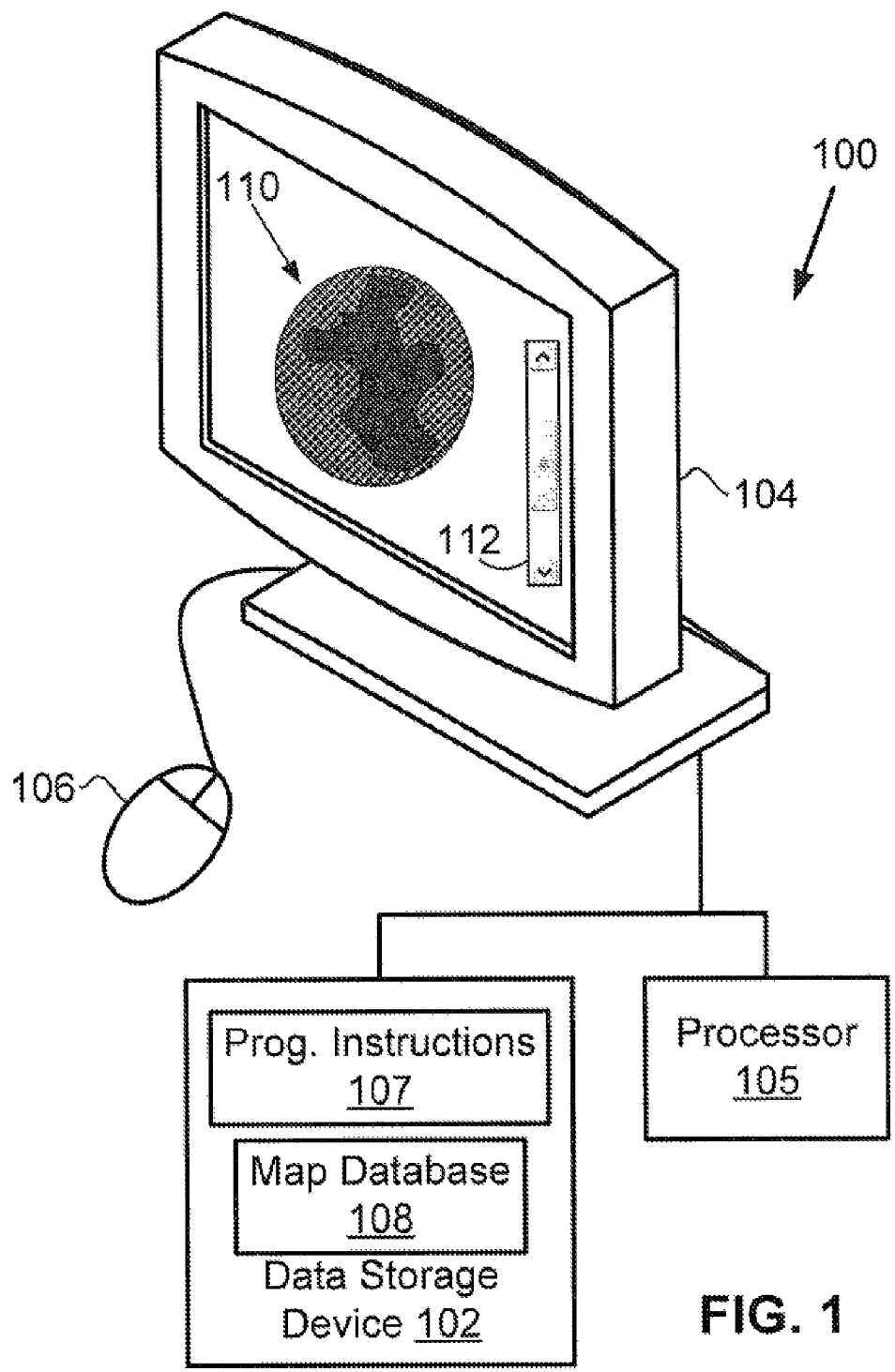
FIG. 1 is an illustration of a system in accordance with the example embodiments described herein.

FIG. 1 illustrates example elements of a system 100 for creating and displaying maps with three-dimensional ("3D") features. The 3D features may comprise major 3DRs and minor 3DRs. System 100 includes a data storage device 102, a display device 104, a processor 105, and a user-input device 106. Data storage device 102 may comprise a non-transitory computer-readable storage medium accessible by processor 105. Data storage device 102 contains various data such as, but not limited to, computer-readable program instructions 107 and a map database 108.

Display device 104 is operable to display various data, graphics, images, and, as shown in FIG. 1, map 110 and scroll bar 112. Map 110 may be defined by data stored within map database 108. User-input device 106 may be operable to move a slider within scroll bar 112 so as to change a resolution of map 110 (e.g., increase or decrease the geographical area shown by map 110). User-input device 106 may comprise a pointing device such a mouse.

Map database 108 comprises various data that can be read by processor 105 to generate map 110. As an example, map database 108 may comprise data that identifies a road network. The road network may include a plurality of road links (or segments), each of which may be defined, in part, by nodes that are located at either end of a road link. Map database 108 may be a relational database having data that associates each road link with other data stored within map database 108. For example, the data associated with a road link may include point-of-interest ("POI") data for points of interest located on or near the road link, and road description data and/or attributes, such as data that identifies a speed limit, address ranges, turn restrictions, geographic coordinates, street names, shape, a slope, a number of lanes for the road link, and/or other data or attributes.

The map or geographic database 108 may be a master geographic database stored in a format that facilitates updating, maintenance, and development. For example, geographic database 108 or data in the geographic database 108 is in an Oracle spatial format or other spatial format, such as for development or production purposes. The Oracle spatial format or development/production database may be compiled into a delivery format, such as a GDF format. The data in the production and/or delivery formats may be compiled or further compiled to form geographic database products or databases, which may be used in end user navigation devices or systems.

For example, geographic or map data is compiled (such as into a PSF format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases. As mentioned above, the database 108 may be a master geographic database, but in alternate embodiments, the database 108 may represent a compiled navigation database (or other database) that may be used in or with end user devices to provided navigation-related functions.

Figure 2:
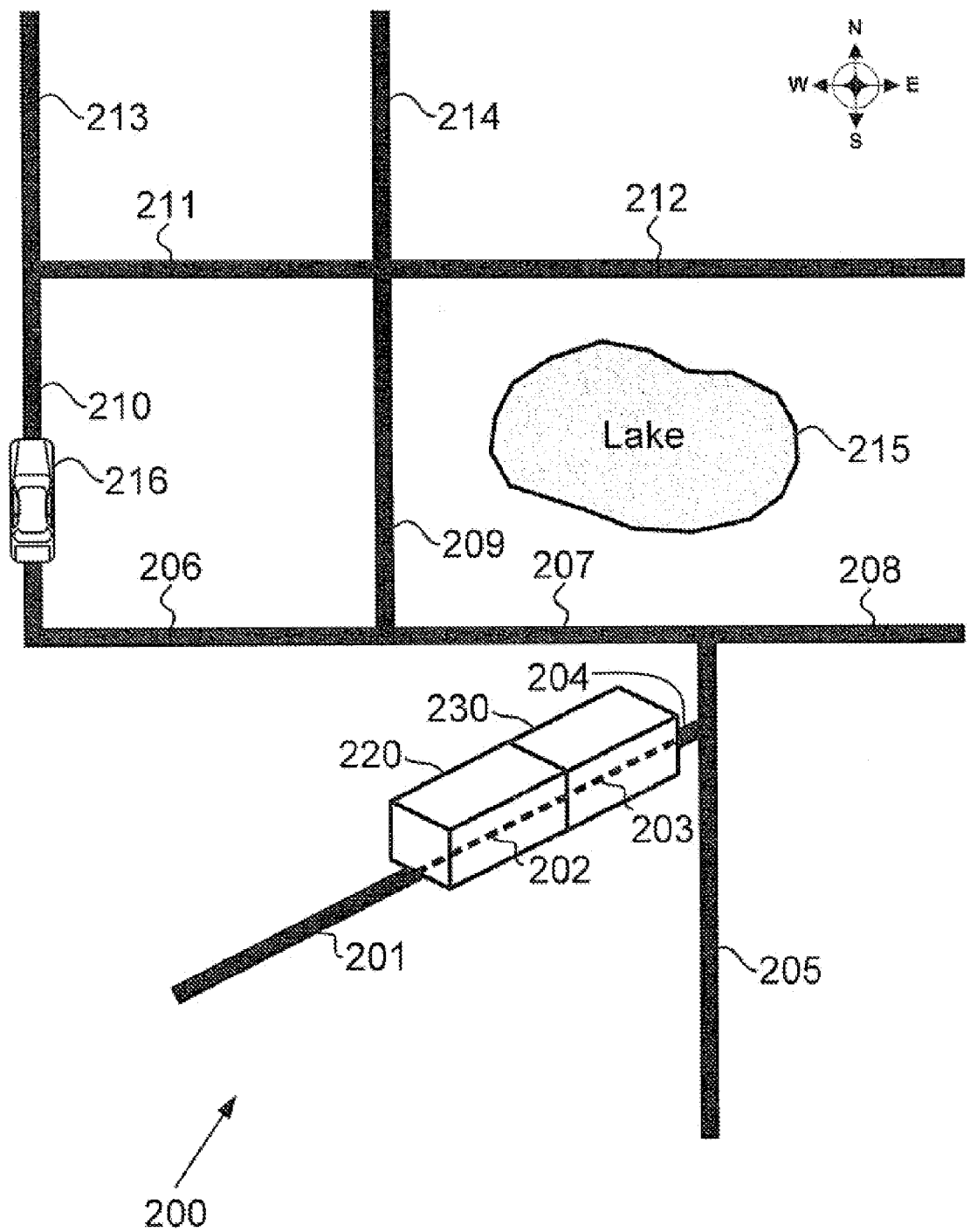
FIG. 2 is a map with three-dimensional features that is displayable via a display device.

Next, FIG. 2 illustrates an alternative view of map 110. The map shown in FIG. 2 includes elements displayable on display device 104, and is referred to herein as map 200. Map 200 includes road links 201 to 214, lake 215, and vehicle 216. Road links 201 to 214 are defined in map data base 108. Lake 215 may be a POI identified in map database 108. Vehicle 216 is illustrated on map 200 as a vehicle 216 that can travel on a road network including road links 201 to 214. Display device 104 may not actually display vehicle 216 when displaying the other elements of map 200.

FIG. 2 also illustrates two three-dimensional ("3D") features. Those features are major three-dimensional region ("major 3DR") 220 and major 3DR 230. In accordance with the example embodiments, additional 3D features, such as one or more other major 3DRs and one or more minor three-dimensional regions ("minor 3DRs"), may be displayed on map 200. A major 3DR represents a geographical area on Earth's surface and a volume of space above that geographical area. As an example, the geographical area associated with a major 3DR may comprise a city block (e.g., a portion of a road between two cross roads, and adjacent portions of land on either side of the street). A minor 3DR represents a 3D portion of space within a major 3DR. Major 3DRs are not included within any other 3DR.

Various levels of minor 3DRs may be defined. For example, starting with a minor 3DR that represents an entire 3D object, such as a building, the minor 3DR can be recursively subdivided into a plurality of sub-minor 3DRs.

Furthermore, one or more sub-minor 3DRs can be subdivided into a plurality of sub-sub-minor 3DRs, and so on down to the smallest level of sub-. . . -sub-minor 3DR desired. Each minor 3DR can provide a visual depiction of the geometrical shape of a 3D object. Each additional sub-level 3DR (i.e., a smaller 3DR) can provide a visual depiction of the geometrical shape of a smaller portion of the 3D object as compared to any previous level of 3DR. The major and minor 3DRs, as well as any level of sub-minor 3DRs, may be displayed as a prism. In particular, the prism may comprise a rectangular prism such as a cube.

The level of minor 3DRs displayed on a map can be based on the distance from a viewer's viewpoint. For instance, a 3D object relatively far away from the viewer's viewpoint may be displayed as a single minor 3DR on map 200, but as the viewer's viewpoint moves closer to that 3D object, map 200 may be updated to display the 3D object as a plurality of sub-minor 3DRs, and as the viewer's viewpoint moves even closer to that 3D object, map 200 may be updated to display the 3D object as a plurality of sub-sub-minor 3DRs.

The smallest level 3DR may, for example, represent a real-world cubic region with sides having lengths of 0.25 meters and a volume of 0.015625 meters cubed. The 3DRs displayed on display device 104 are preferably displayed at a reduced scale (e.g., $\frac{1}{20}^{th}$ scale). In that regard, 1.0 meters (real-world size)=0.05 meters (displayed). Accordingly, a minor 3DR representing a real-word cubic region with sides of 0.25 meters would be displayed on display device 104 as a cubic region with sides of 0.0125 meters. Other examples of the reduced scale are also possible.

Map database 108 may comprise data that defines each 3DR displayable on display device 104. That data may include a unique identifier for each defined 3DR.

Figure 3:
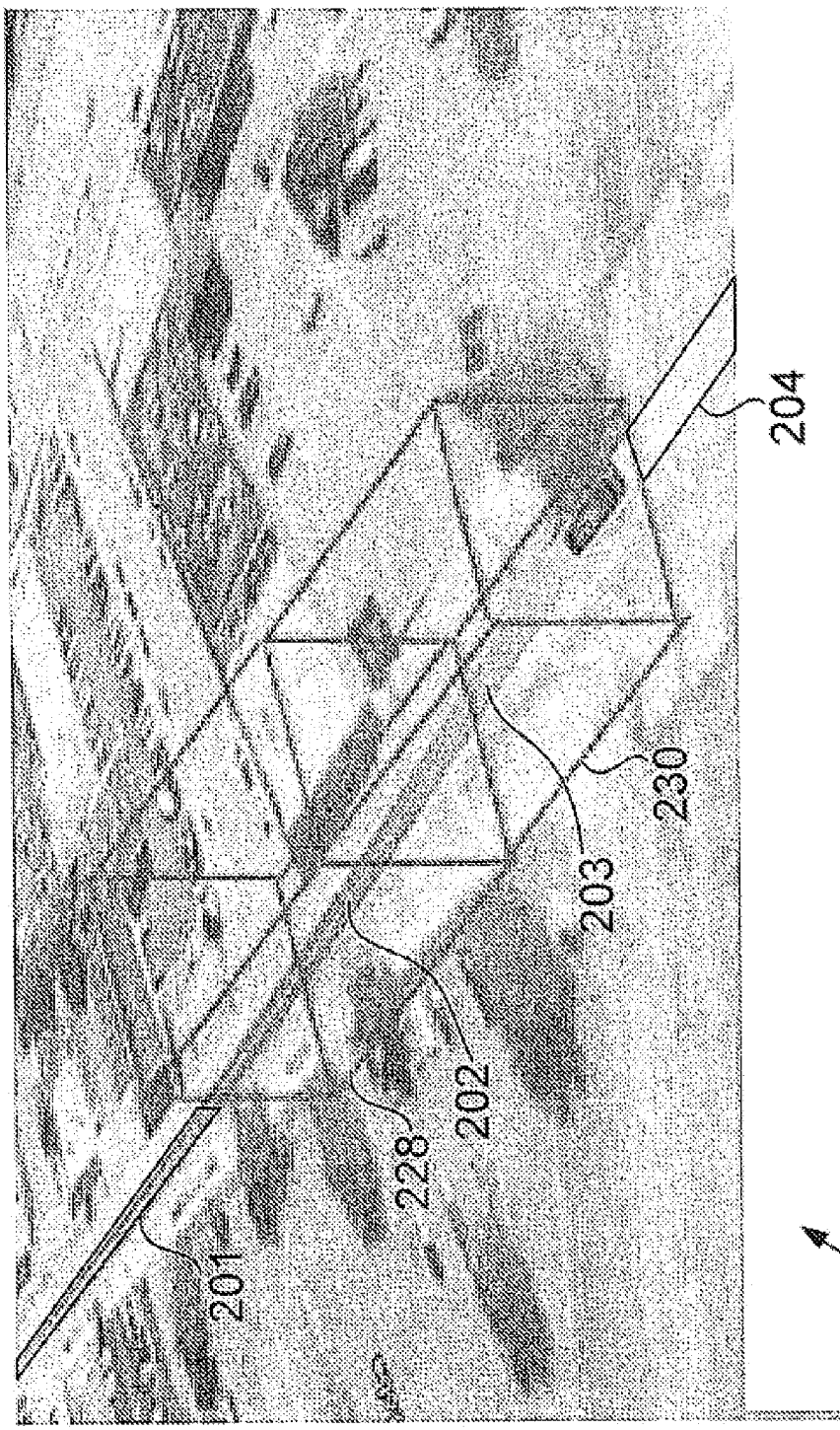
FIG. 3 is an alternative view of the map illustrated in FIG. 2.

Next, FIG. 3 illustrates an alternative view of map 200. In FIG. 3, relative to FIG. 2, the resolution of map 200 has been increased such that map 200 is displaying a smaller geographical area. Furthermore, in FIG. 3, map 200 is displayed using satellite imagery as an underlying image upon which major 3DRs 228 and 230 are placed. Furthermore still, FIG. 3 illustrates some walls of major 3DRs 228 and 230 that are not shown in FIG. 2.

Figure 4:
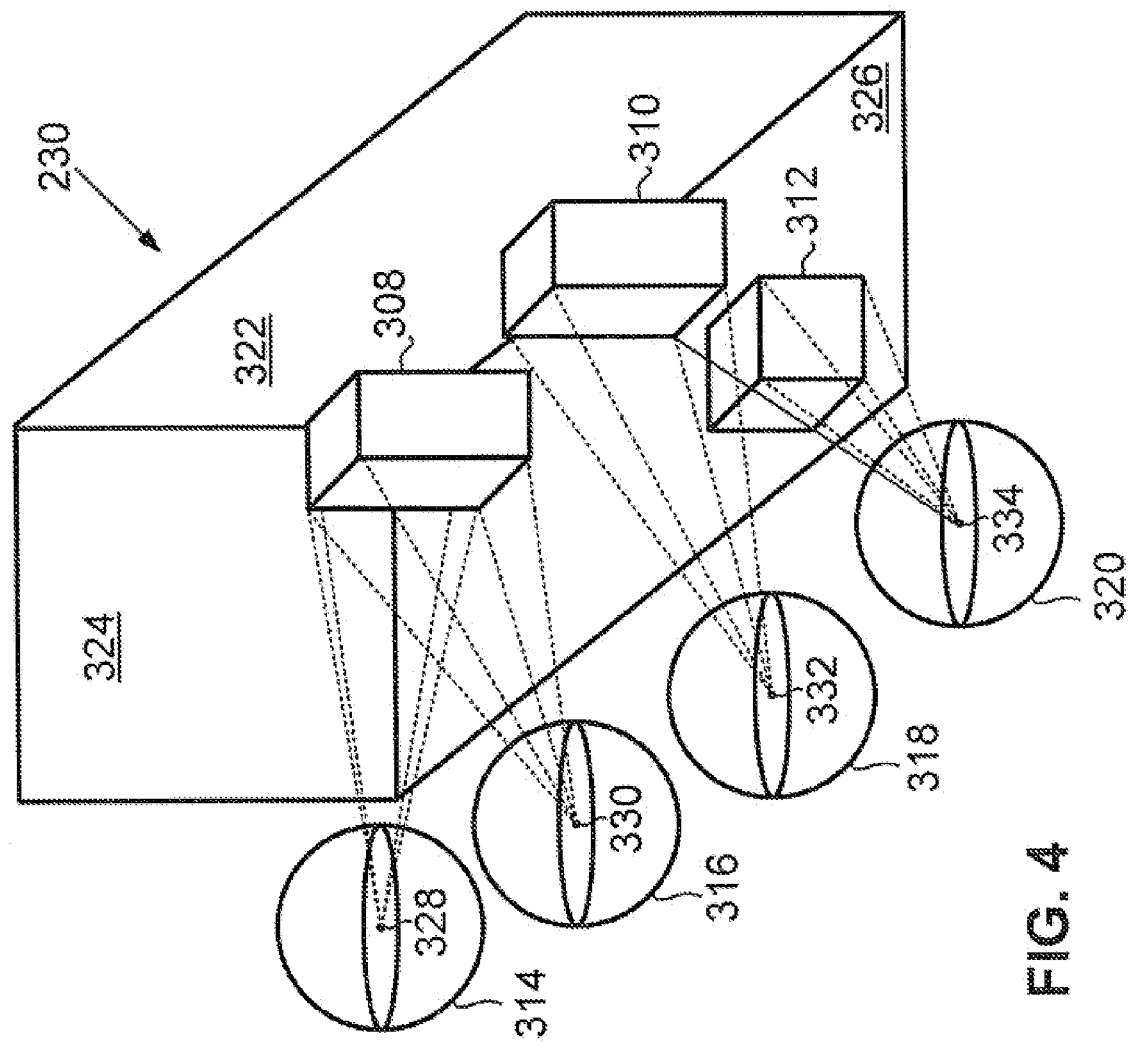
FIG. 4 is a block diagram of example three-dimensional features displayable on a map.

Next, FIG. 4 is a block diagram of example 3D features that are visually presentable on map 200, and features, defined by data stored in map database 108, for use in visually presenting the 3D features. The visually-presentable features include major 3DR 230 and minor 3DRs 308, 310, and 312. The left-hand side of FIG. 4 illustrates major 3DR 230 when it is viewed from a viewpoint outside of major 3DR 230, whereas the right-hand side of FIG. 4 illustrates major 3DR 230 when it is viewed from a viewpoint inside of major 3DR 230. The two viewpoints of major 3DR 230 also illustrate that the size of a major 3DR may change as the resolution of map 200 changes.

As illustrated in FIG. 4, major 3DR 230 includes top 302, walls 304, 306, 322, 324, and bottom 326. Other 3DRs displayable on map 200, such as major 3DRs and minor 3DRs, may also comprise 4 walls, a top, and a bottom. In additional to data that defines each 3DR wall, top and bottom, map database 108 may include data that defines one or more surfaces for each of those walls, top, and bottom. Those one or more surfaces may include an inner surface and outer surface. In FIG. 4, the outer surfaces of top 302 and walls 304 and 306 are visible from the viewpoint outside of major 3DR 230, and the inner surfaces of bottom 326 and walls 322 and 324 are visible from the viewpoint inside of major 3DR 230.

FIG. 4 illustrates image bubbles 314, 316, 318, and 320. Those image bubbles represent images and location data of a location from which those images were captured. Each image bubble or the images contained within an image bubble may be (i) captured via vehicle 216 as it is driven over a road network, and (ii) subsequently stored within map database 108.

To capture those images, vehicle 216 may include 6 cameras such as a forward camera to capture forward-facing images, a rearward camera to capture rearward-facing images, a left-side camera to capture left-facing images, a right-side camera to capture right-facing images, an upward camera to capture upward-facing images, and a downward camera to capture downward-facing images (e.g., images of Earth's surface (i.e., the ground)). Those 6 cameras allow the capture of 360 degree imagery. Vehicle 216 may also include a global positioning system ("GPS") receiver and associated circuitry for determining the location data. Other examples of the number of cameras used to capture the images for an image bubble or to determine the location of the cameras are also possible. Also, panoramic camera(s), such as a 360 degree panoramic camera, may be used.

The images from image bubbles 314, 316, 318, and 320 or from some other image bubble may be used to texture one or more of the surfaces of a 3DR. The dashed lines extending from image bubbles 314 and 316 illustrate that two walls of minor 3DR 308 can be textured with images from those image bubbles. Another wall of minor 3DR 308 may be textured with images from image bubble 318. The dashed lines extending from image bubble 318 illustrate that a wall of minor 3DR 310 can be textured with an image from image bubble 318. The dashed lines extending from image bubble 320 illustrate that a wall of minor 3DR 312 can be textured with an image from image bubble 320. While minor 3DRs 308, 310, and 312 are being displayed on a map, walls 322 and 324 and bottom 326 can be textured with respective images from map database 108 so as to provide a backdrop for viewer context.

A data storage device, such as data storage device 102, may comprise program instructions that are executable to identify which image or composition of multiple images should be textured onto a surface of a 3DR. Those program instructions may identify the image(s) based on various factors such as proximity of an image bubble to the 3DR surface, and whether there is an obstruction between an image bubble and the 3DR to be textured. The obstruction may be another 3D object. As an example, the program instructions may determine that a vector (represented as the solid line extending from image bubble 320 to minor 3DR 310) passes through another 3D object (e.g., minor 3DR 312) before making contact with the 3DR to be textured (e.g., minor 3DR 310).

Figure 5:
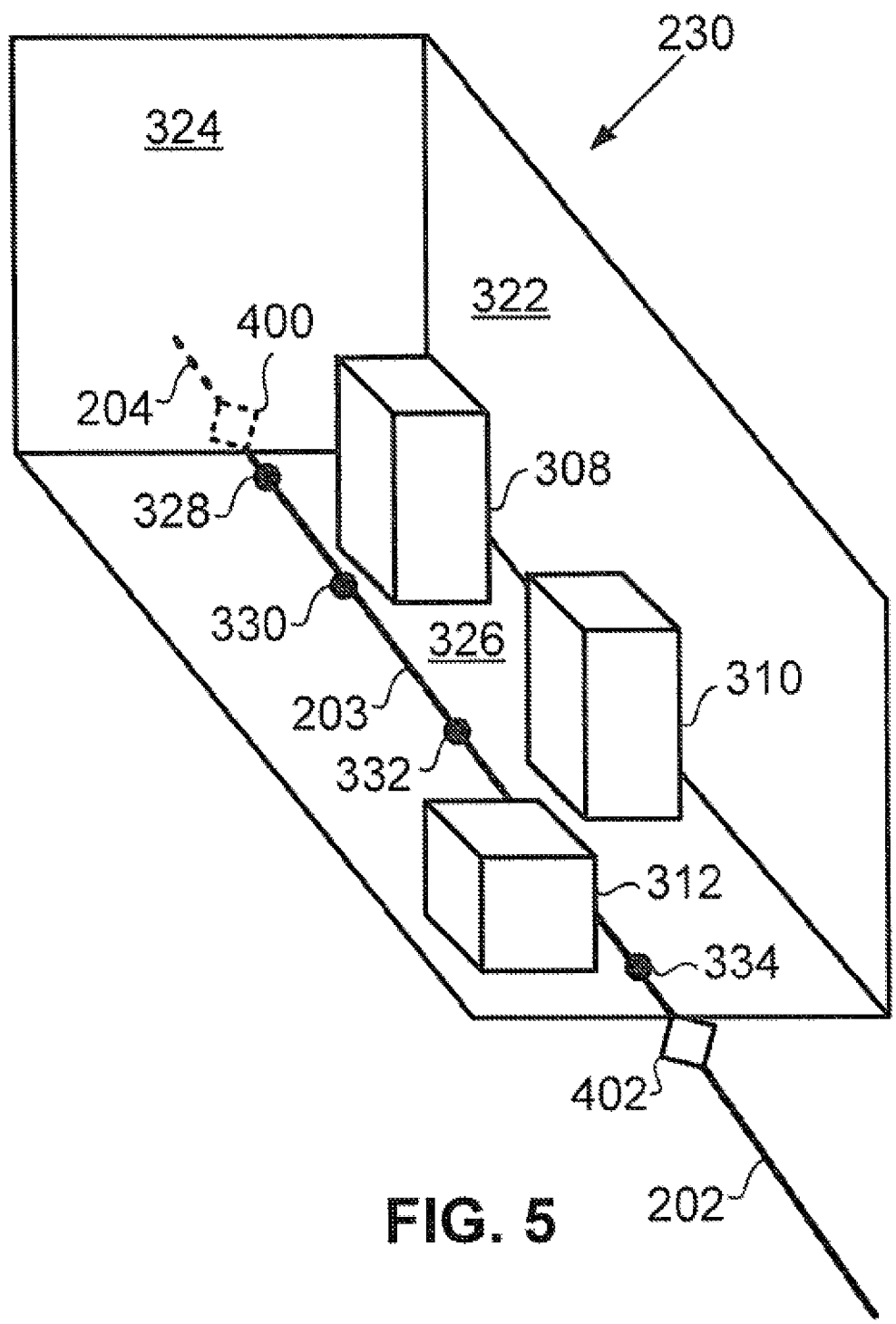
FIG. 5 is a block diagram of a major three-dimensional region.

Next, FIG. 5 illustrates details pertaining to major 3DR 230. In particular, FIG. 5 illustrates road links 202, 203, and 204 and nodes 400 and 402. Each of those links and nodes, as well as a plurality of other road links and nodes of the road network, may be defined in map database 108. Road link 203 extends between nodes 400 and 402. Locations 328, 330, 332, and 334 indicate locations (e.g., a respective latitude and longitude) on or directly above road link 203 and are associated with image bubbles 314, 316, 318, and 320, respectively. In that regard, each of those locations indicates a location at which the images associated with an image bubble were captured.

The minor 3DRs, road links, and nodes located within a major 3DR and/or within a geographical area associated with the major 3DR, may be associated with the major 3DR and, in some cases, with each other. For example, major 3DR 230, road link 203, and minor 3DRs 308, 310, and 312 may be associated with each other. In that way, when any one of those elements is selected for view on display device 104, each of the other elements may be retrieved from map database 108 and simultaneously displayed with the selected element due to its association with the selected element. In an alternative arrangement, major 3DR 230, as well as one or more other major 3DRs, may be associated multiple road links.

Figure 6:
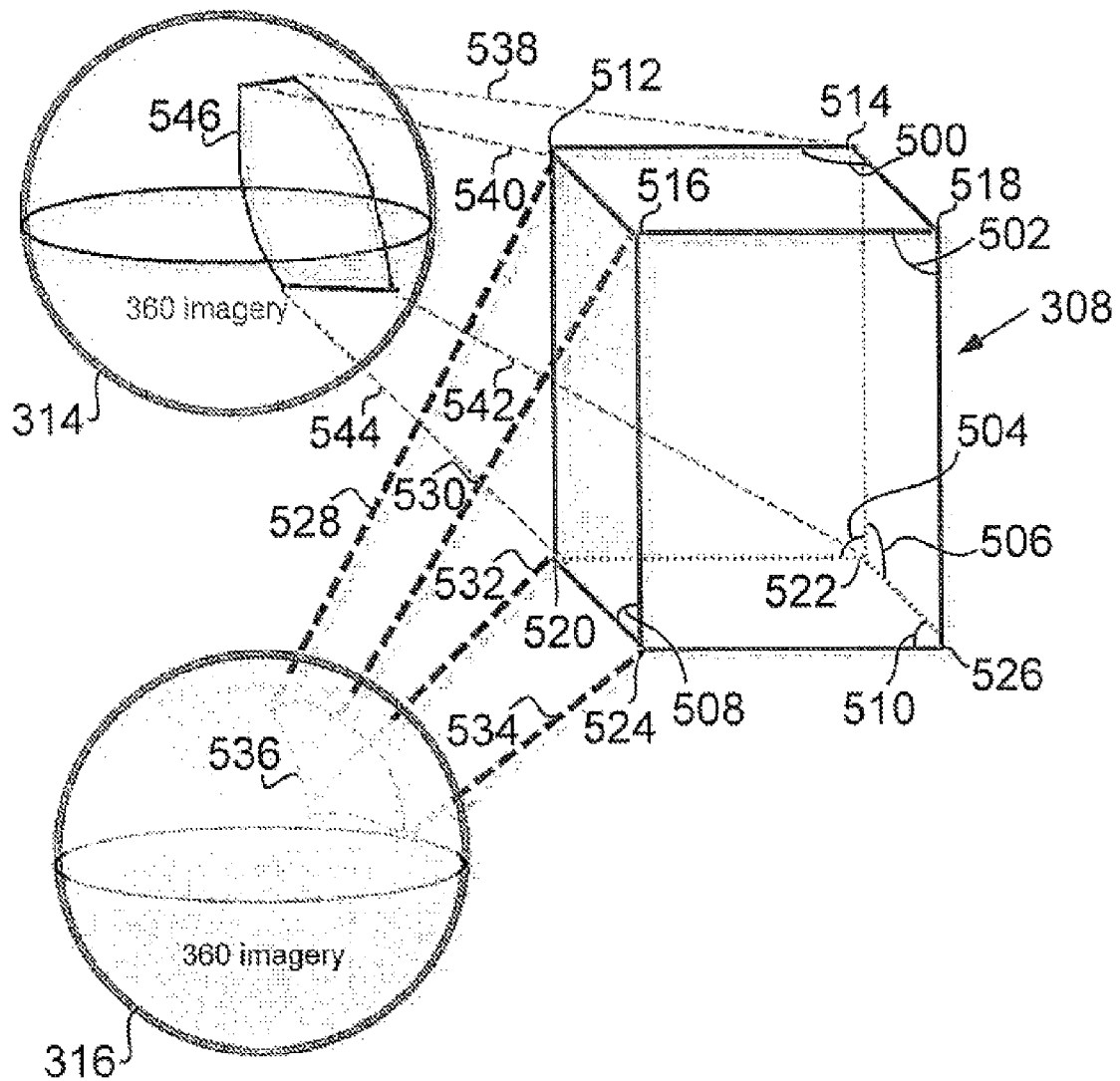
FIG. 6 is a diagram showing a textured three-dimensional region displayable on a map.

Next, FIG. 6 illustrates details of texturing a 3DR displayed on a map. Those details are applicable to texturing major 3DRs and any level of minor 3DRs. As illustrated in FIG. 6, minor 3DR 308 includes a top 500, walls 502, 504, 506, and 508, and bottom 510. Map database 108 may include data that defines vertices 512, 514, 516, 518, 520, 522, 524, and 526. Each vertex is associated with a particular location. Map database 108 may store a latitude, longitude, and elevation for one of the vertices (e.g., vertex 520) and store other data that represent x, y, and z coordinates relative to the location of vertex 520. Alternatively, map database 108 may store a latitude, longitude, and elevation for each vertex defined for a 3DR.

Program instructions 107 may be executable to determine vectors between the vertices defined for a 3DR and an image capture location of one or more image bubbles. Each image bubble can comprise a plurality of two-dimensional (2D) images wrapped around a sphere. Each image capture location may be represented at the center of the image bubble.

As an example, vectors 528, 530, 532, and 534 may be defined between the center of image bubble 316 and vertices 512, 516, 520, and 524, respectively. The intersection of vectors 528, 530, 532, and 534 at the surface of image bubble 316 may be used to define an image area 536. The portion of the images of image bubble 316 within image area 536 may be textured onto wall 508.

As another example, vectors 538, 540, 542, and 544 may be defined between the center of image bubble 314 and vertices 514, 512, 522, and 520, respectively. The intersection of vectors 538, 540, 542, and 544 at the surface of image bubble 314 may be used to define an image area 546. The portion of the images of image bubble 314 within image area 546 may be textured onto wall 504.

Figure 7:
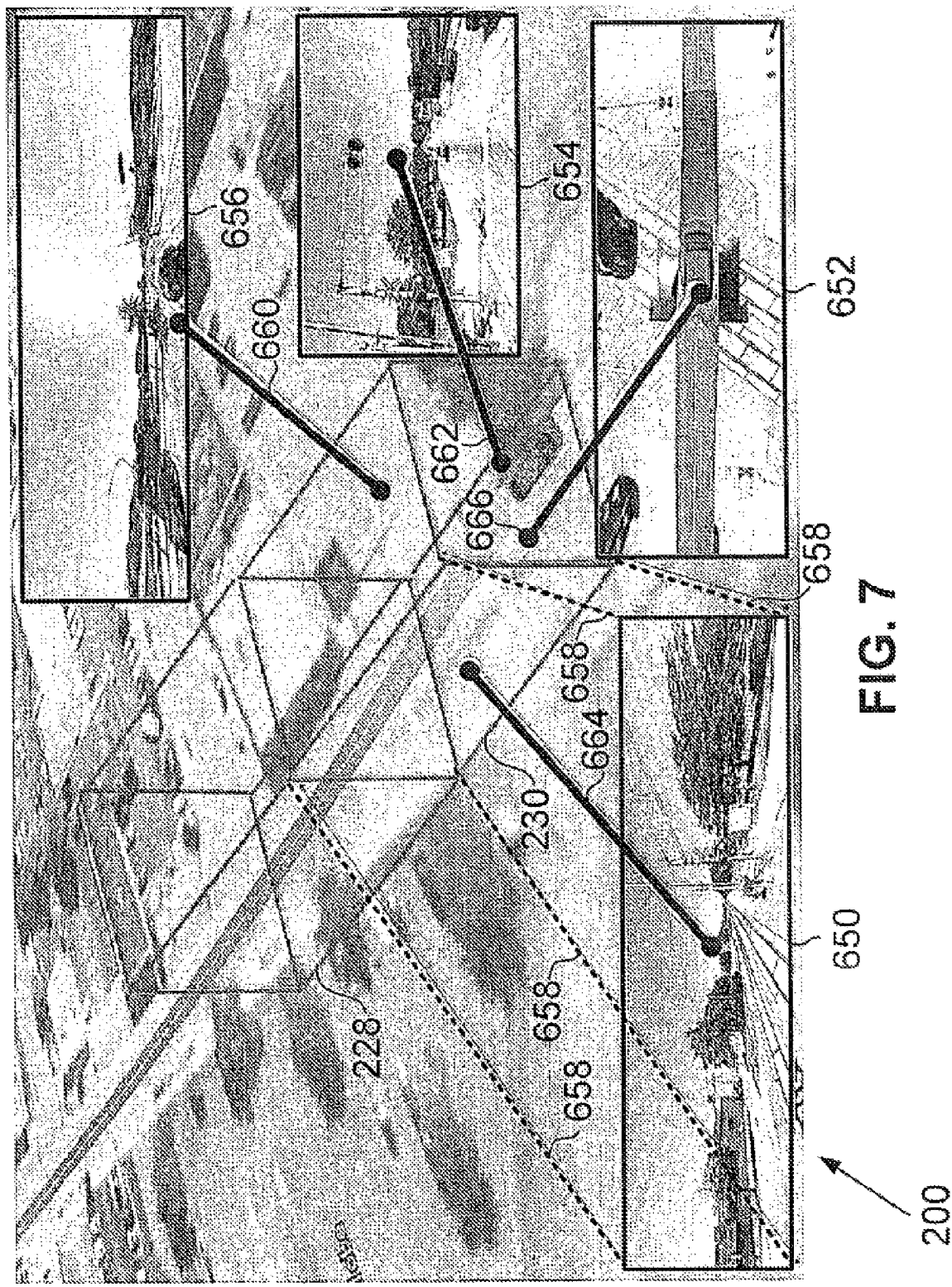
FIG. 7 is a map including images for texturing onto surfaces of a three-dimensional region displayed on the map.

Next, FIG. 7 illustrates example images 650, 652, 654, and 656 that can be textured onto the surfaces of major 3DR 230. Image 650 may comprise one or more images captured via the left-side camera of vehicle 216. Image 652 may comprise one or more images captured via the downward-facing camera of vehicle 216. Image 654 may comprise one or more images captured via the forward-facing camera of vehicle 216. Image 656 may comprise one or more images captured via the right-side camera of vehicle 216. Reference lines 660, 662, 664, and 666 lead to elements of major 3DR 230 onto which images 656, 654, 652, and 650, respectively, may be textured (e.g., projected onto). As an example, reference line 660 leads to wall 306, reference line 662 leads to wall 324, reference line 664 leads to wall 322, and reference line 666 leads to bottom 326.

Images 650, 652, 654, and 656 may be determined from the surface area of image bubbles stored in map database 108. Those surface areas may be determined by vectors that pass through the surface of an image bubble. FIG. 7 illustrates vectors 658 that extend from vertices of major 3DR 230 to corners of image 650. Vectors 658 may pass through the surface of an image bubble that contains image 650. Other 3DRs displayable on map 200 may be textured with images determined by passing vectors through one or more image bubbles that are associated with the geographical locations associated with those other 3DRs.

Figure 8:
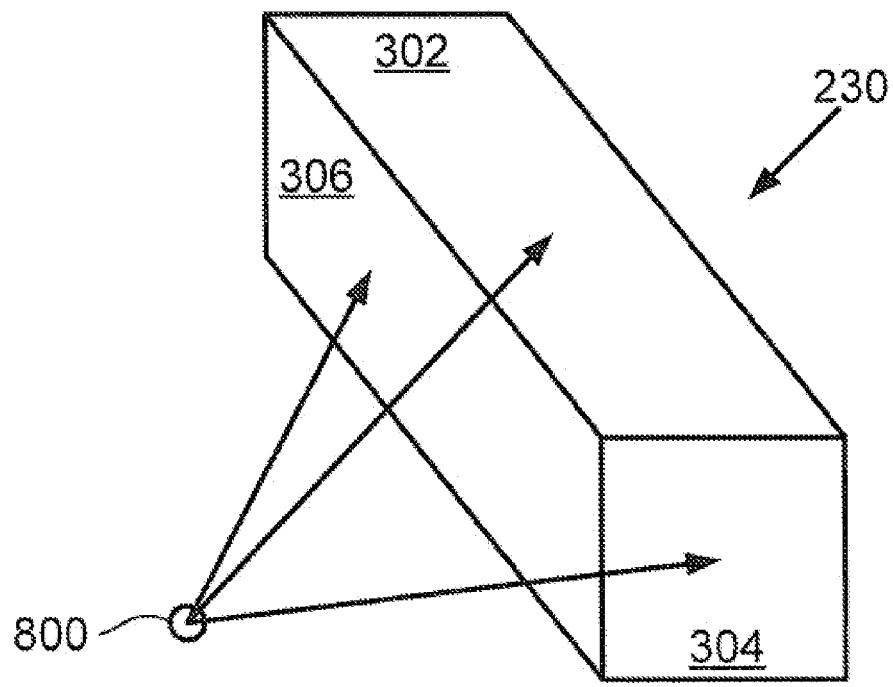
FIG. 8 is a block diagram showing viewpoints with respect to a major three-dimensional region.
Figure 8:
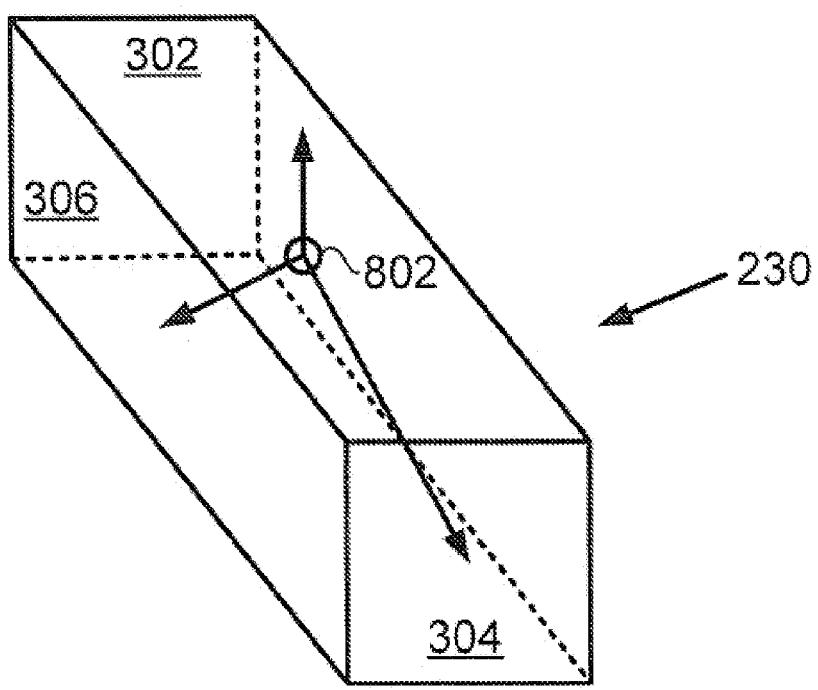

Next, FIG. 8 illustrates two viewpoints 800 and 802 of major 3DR 230. Viewpoint 600 is located outside of 3DR 230, whereas viewpoint 802 is located within 3DR 230. The textures viewable on a wall, top, or bottom of a major 3DR may differ depending on whether the inner or outer surface of that wall, top, or bottom is being displayed. In that regard, multiple textures may be associated with a wall, top, or bottom, and the textures displayed for such a wall, top, or bottom may be switched when display device 104 switches from displaying the inner surface to the outer surface of that wall, top, or bottom, and when display device 104 switches from displaying the outer surface to inner surface of that wall, top, or bottom.

In one respect, when display device 104 is displaying major 3DR 230 from viewpoint 600, display device 104 may display 3DR 230 such that the outer surfaces of top 302 and walls 304 and 306 are displayed and textured with images from one or more image bubbles. In particular, the outer surface of top 302 may be textured with portions of one or more downward facing images from one or more image bubbles, the outer surface of wall 304 may be textured with portions of one or more forward-facing images from one or more image bubbles, and the outer surface of wall 306 may be textured with portions of one or more right-facing images from one or more image bubbles.

In another respect, when display device 104 is displaying major 3DR 230 from viewpoint 802, display device 104 may display 3DR 230 such that the inner surfaces of top 302 and walls 204 and 206 are displayed and textured with images from one or more image bubbles. In particular, the inner surface of top 302 may be textured with portions of one or more upward facing images from one or more image bubbles, the inner surface of wall 304 may be textured with portions of one or more rearward-facing images from one or more image bubbles, and the inner surface of wall 306 may be textured with portions of one or more left-facing images from one or more image bubbles.

Table 1 contains data that illustrates the various images that may be textured onto a surface of major 3DR 230. The 3-digit numbers in Table 1 correspond to the reference characters in FIG. 4. The inner surfaces of major 3DR 230 are displayable from a viewpoint inside the 3DR. The outer surfaces of major 3DR 230 are displayable from a viewpoint outside of the 3DR. The "Image View" column identifies the camera view used to acquire an image that can be textured onto the surface. Additionally or alternatively, the "Image View" column can identify an image area formed by the intersection of vectors passing through the surface of an image bubble. The "Image Bubble" column identifies which image bubble(s) contain the image view. As an example, the inner surface of top 302 and the outer surface of bottom 326 may be textured with the upward-facing image from image bubble 316. Furthermore, images from multiple image bubbles may be used to texture a surface of the 3DR. For example, right-facing images from images bubbles 316 and 318 may be used to texture the outer surface of wall 306.

TABLE 1

| 3DR | 3DR Structure Element | 3DR Structure Element Surface | Image View | Image Bubble |
|---|---|---|---|---|
| 230 | Top (302) | Inner | Upward-facing | 316 |
| 230 | Top (302) | Outer | Downward-facing | 316 |
| 230 | Wall (304) | Inner | Rearward-facing | 320 |
| 230 | Wall (304) | Outer | Forward-facing | 320 |
| 230 | Wall (306) | Inner | Left-facing | 316 |
| 230 | Wall (306) | Outer | Right-facing | 316 and 318 |
| 230 | Wall (322) | Inner | Right-facing | 316 and 318 |
| 230 | Wall (322) | Outer | Left-facing | 316 |
| 230 | Wall (324) | Inner | Forward Facing | 314 |
| 230 | Wall (324) | Outer | Rearward Facing | 314 |
| 230 | Bottom (326) | Inner | Downward-facing | 314 and 318 |
| 230 | Bottom (326) | Outer | Upward-facing | 316 |

Figure 9:
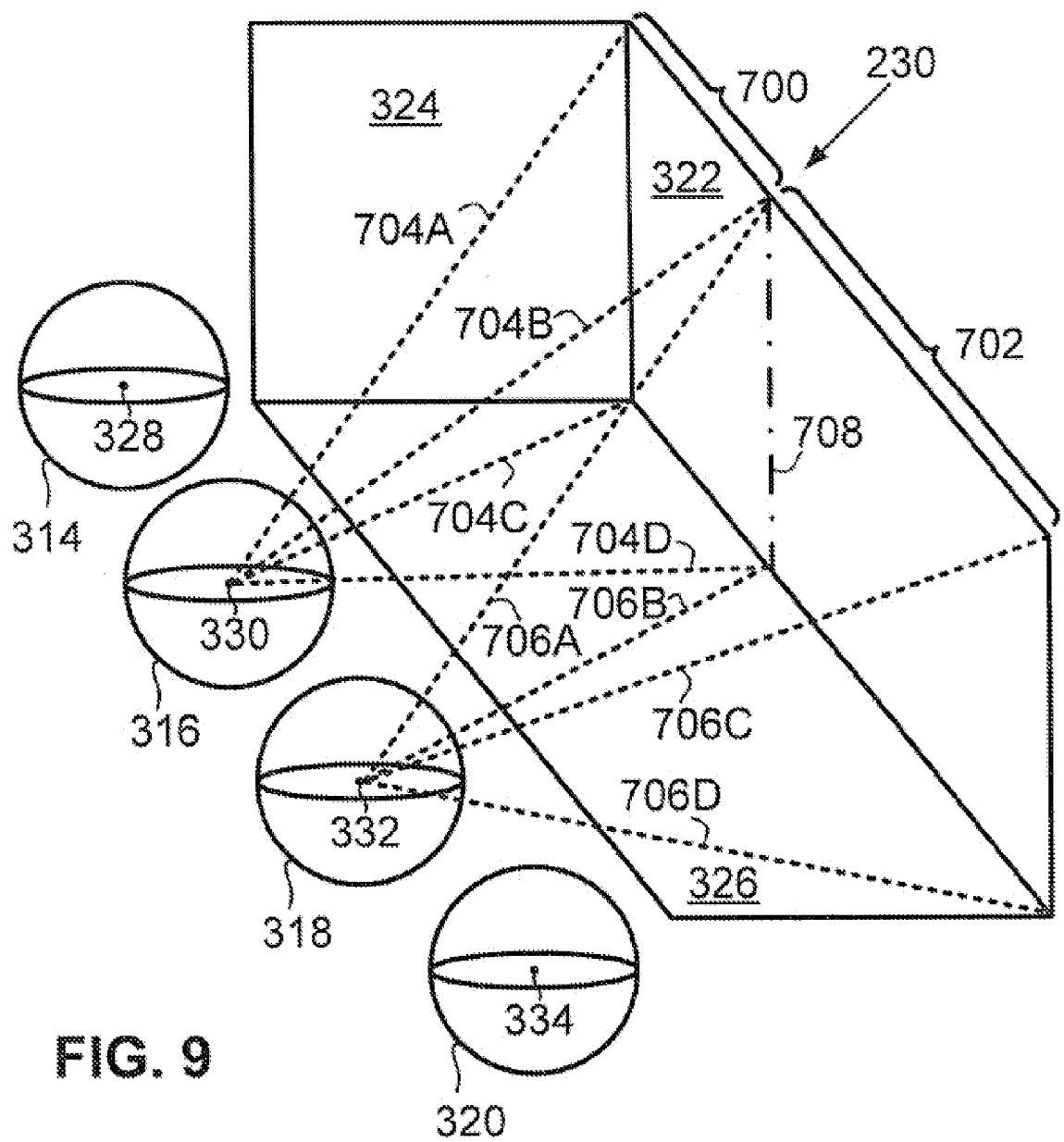
FIG. 9 is a block diagram showing a textured wall of a major three-dimensional region.

Next, FIG. 9 illustrates texturing a wall of major 3DR 230 with images from multiple image bubbles. As illustrated in FIG. 9, the inner surface of wall 322 is partitioned into two wall portions 700 and 702. A vertical partition line 708 illustrates one way in which wall 322 may be partitioned into multiple portions. Other ways to partition wall 322 into multiple wall portions are also possible.

The inner surface of wall portion 700 is textured with an image from image bubble 316. That image may be defined as an image within an area at the surface of image bubble 316. That area that may be defined by connecting the points where vectors 704A, 704B, 704C, and 704D intersect the surface of image bubble 316. Similarly, the inner surface of wall portion 702 is textured with an image from image bubble 318. That image may be defined as an image within an area at the surface of image bubble 318. That area may be defined by connecting the points where vectors 706A, 706B, 706C, and 706D intersect the surface of image bubble 318. In a preferred embodiment, the multiple images textured onto a top, bottom, or wall of a 3DR (e.g., the images from image bubbles 316 and 318) appear as a single image to a person viewing that top, bottom, or wall.

A person having ordinary skill in the art will understand that each top, bottom, and wall of a 3DR may be textured with images from one or more image bubbles. Furthermore, the person having ordinary skill in the art will understand that the top, bottom and each wall of a 3DR may be partitioned into multiple portions by dividers other than a vertical partition line and that such dividers are preferably not displayed on the map display when that 3DR is being displayed.

Figure 21:
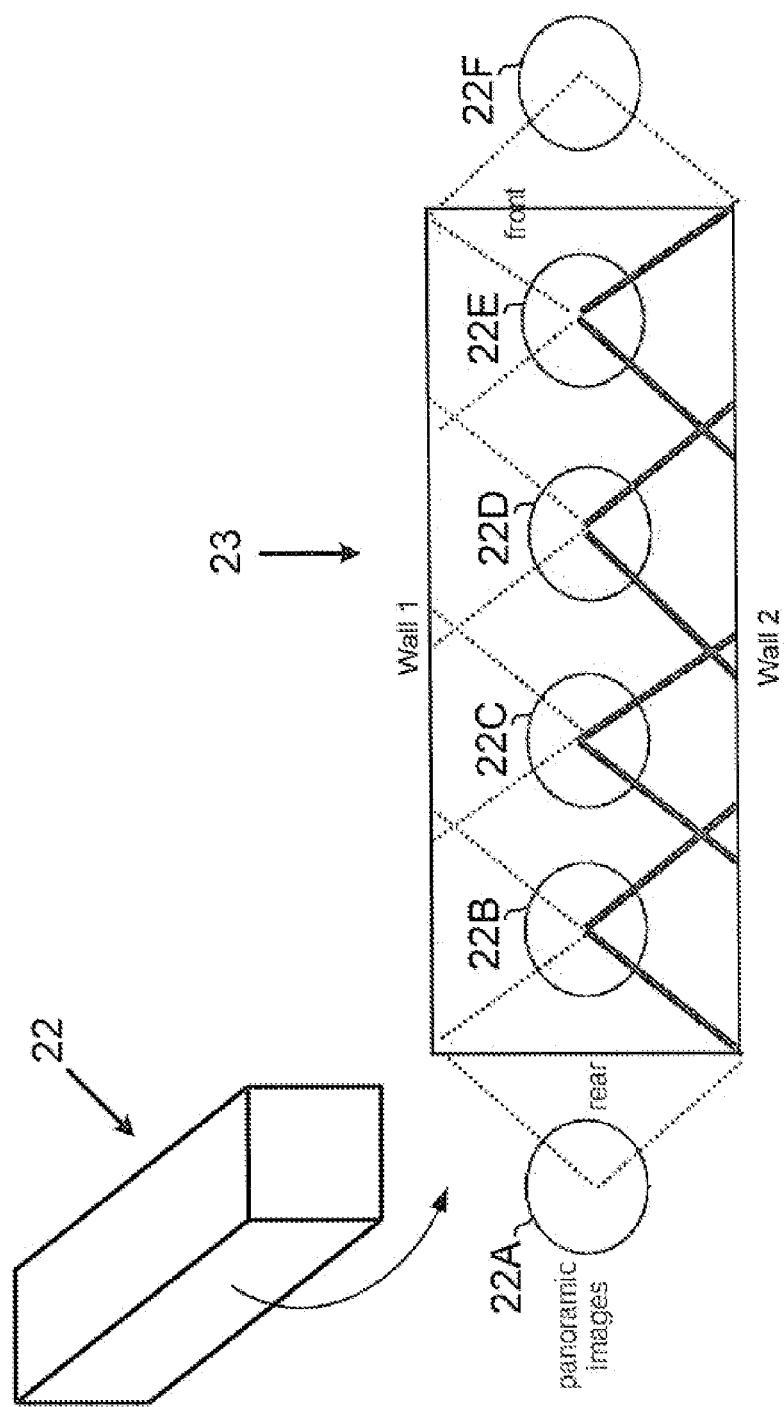
FIG. 21 is a diagram illustrating the use of multiple image bubbles to texture multiple surfaces of a three-dimensional region.

Next, FIG. 21 illustrates using multiple image bubbles 22A, 22B, 22C, 22D, 22E, and 22F to texture multiple surfaces of a 3DR 22. A plan view 23, illustrated in FIG. 21, shows the locations of those image bubbles relative to the front, rear, and side walls of 3DR 22. Table 2 identifies the image bubbles that comprise images that can be textured on to the various surfaces of 3DR 22. A composite image builder can combine images from multiple image bubbles (e.g., image bubbles 22B, 22C, 22D, and 22E) into a single image. That single image could be textured onto the inner surface of Wall 1. The composite image builder can combine other images from the multiple image bubbles to generate a composite image that can be textured onto the inner surface of Wall 2.

TABLE 2

| 3DR Surface | Image Bubble(s) |
| --- | --- |
| Rear outer surface | 22A |
| Rear inner surface | 22B |
| Wall 1 inner surface | 22B, 22C, 22D, 22E |
| Wall 2 inner surface | 22B, 22C, 22D, 22E |
| Front inner surface | 22E |
| Front outer surface | 22F |

Figure 10:
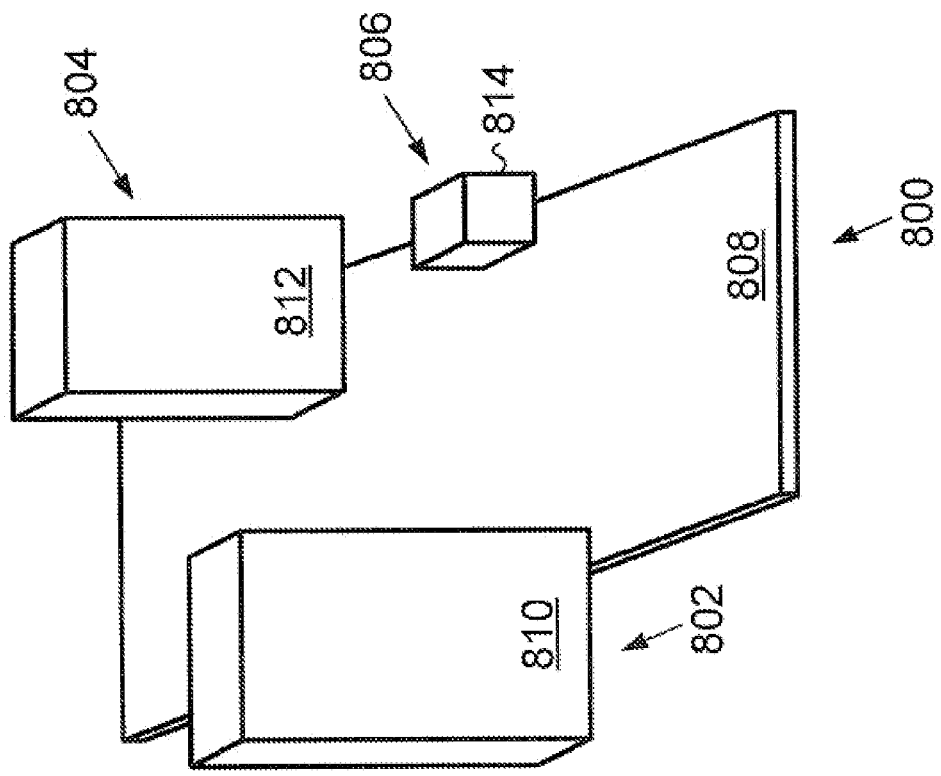
FIG. 10 is a block diagram illustrating the display of three-dimensional features using multiple resolutions of minor three-dimensional regions.
Figure 10:
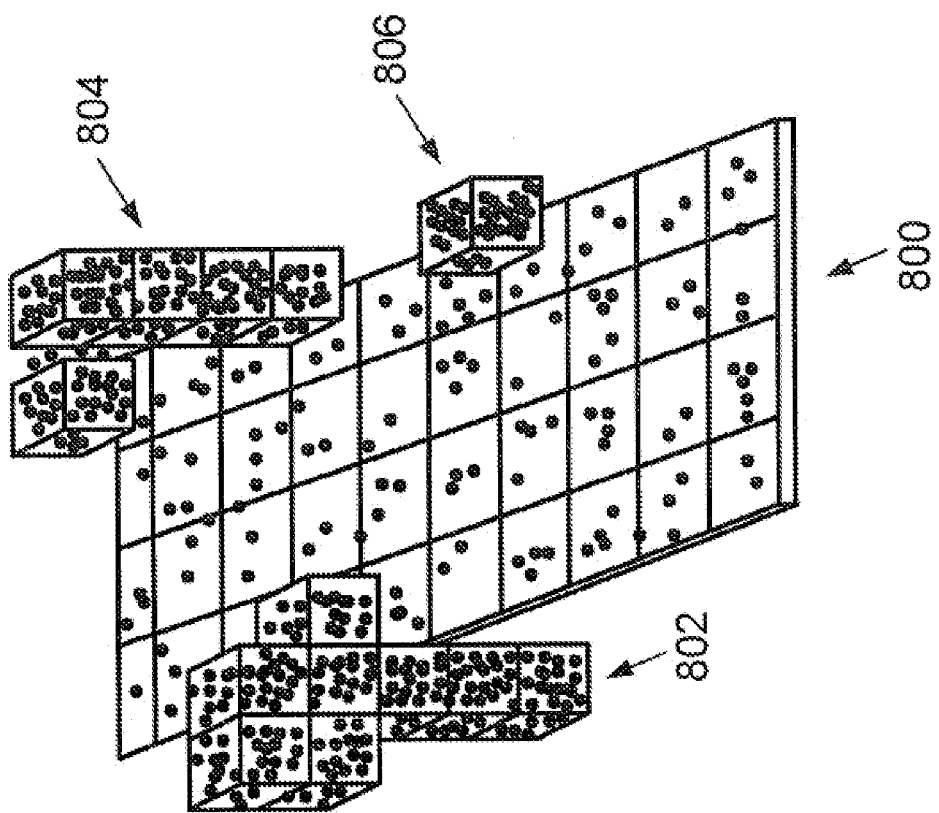

Next, FIG. 10 illustrates displaying features using multiple levels of minor 3DRs. The left side of FIG. 10 has more levels of minor 3DRs than the right side of FIG. 10. The left and right sides of FIG. 10 each include minor 3DRs that represent objects 800, 802, 804, and 806. As an example, object 800 may be a road surface, object 802 may be a tree, object 804 may be a light post with a lamp that extends over the road surface 800, and object 806 may be a fire hydrant. Object 800 may comprise the surface of road link 202 and curbs and sidewalks adjacent to the road link 202.

Since road link 202 is associated with major 3DR 228 and since objects 800, 802, 804, and 806 can be located within a defined geographical area that includes road link 202, objects 800, 802, 804, and 806 may also be associated with major 3DR 228. When an outside view of major 3DR 228 is being displayed on display device 104, one or more surfaces of major 3DR may be textured with images that show objects 800, 802, 804, and 806. When a view inside of major 3DR 228 is being displayed on display device 104, one or more surfaces of major 3DR 228 as well as minor 3DRs may be textured with images of objects 800, 802, 804, and 806.

On the right side of FIG. 10, objects 800, 802, 804, and 806 are each displayed using a respective minor 3DR, namely minor 3DRs 808, 810, 812, and 814, respectively. One or more outer surfaces of the walls, top, and bottom of minor 3DRs 808, 810, 812, and 814 may be textured with one or more images from an image bubble that includes images that show objects 800, 802, 804, and 806, respectively. The texture applied to the top surface of a 3DR may comprise one or more satellite images. A satellite image may be textured onto the top surface of a 3DR if the imaging capturing device that captured images near that 3DR is located below the top surface of that 3DR.

On the left side of FIG. 10, objects 800, 802, and 804 are each displayed using a respective plurality of minor 3DRs. For instance, object 802 is displayed using 8 minor 3DRs and object 804 is displayed using 5 minor 3DRs. The shapes of objects 802 and 804 may be defined more accurately by using multiple minor 3DRs that have a smaller volume as compared to using a single 3DR to define those objects. In that regard, as the size (e.g., volume) of the minor 3DRs decreases, the resolution of the 3DRs increases. One or more outer surfaces of the minor 3DRs used to display objects 800, 802, 804, and 806 may be textured with one or more images from an image bubble that includes images that show objects 800, 802, 804, and 806, respectively.

Figure 16:
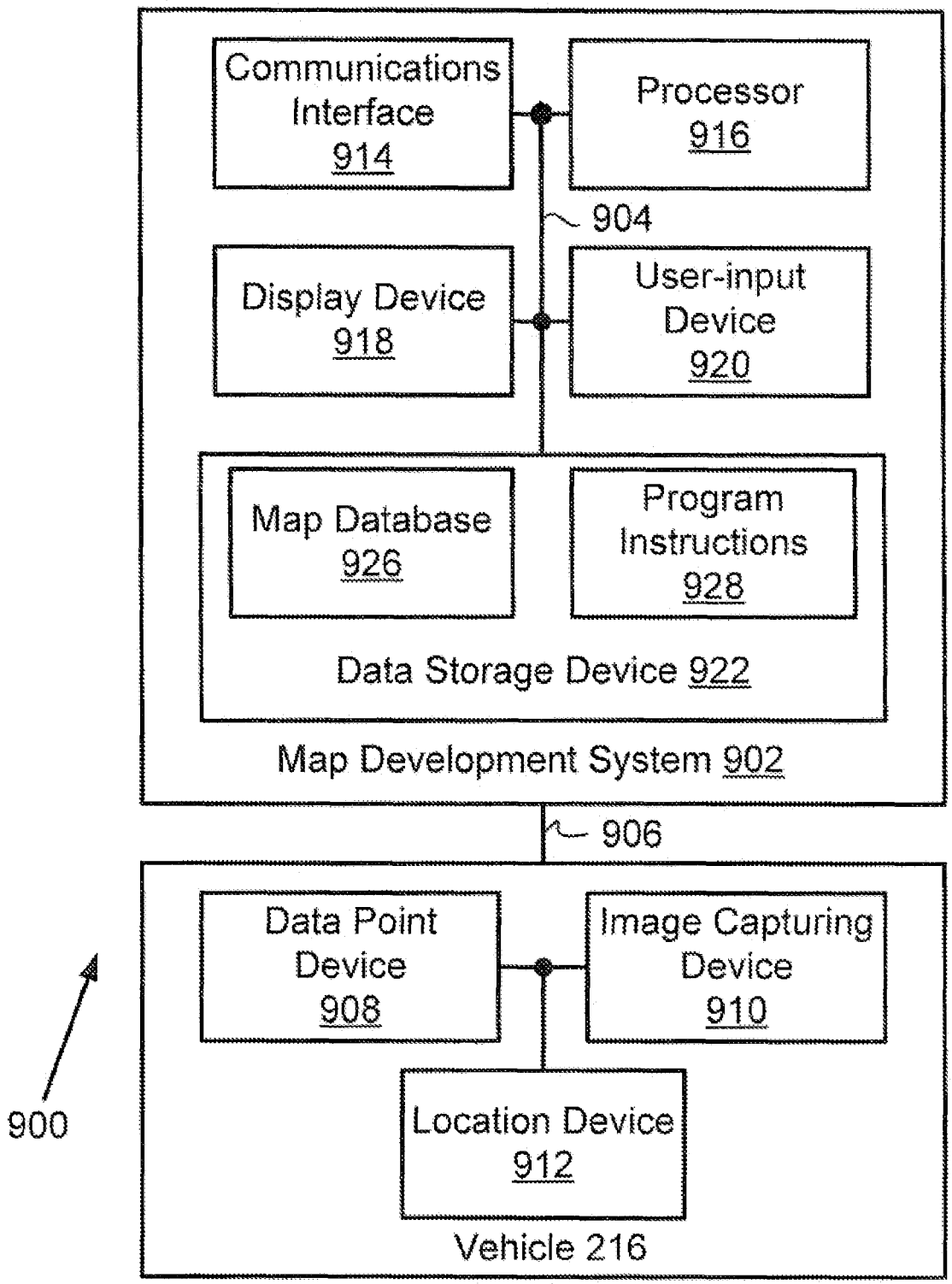
FIG. 16 is a block diagram of a system in accordance with the example embodiments described herein.

The left side of FIG. 10 illustrates solid black circles that represent object-detection data (or more simply "data points") generated by a data point device 908 (shown in FIG. 16). Data storage device 102 may store data that represents each data point (e.g., location of that data point) and data that associates each data point with a minor 3DR in which that data point is located. The data that associates a data point with a minor 3DR may comprise the unique identifier of the minor 3DR.

Figure 17:
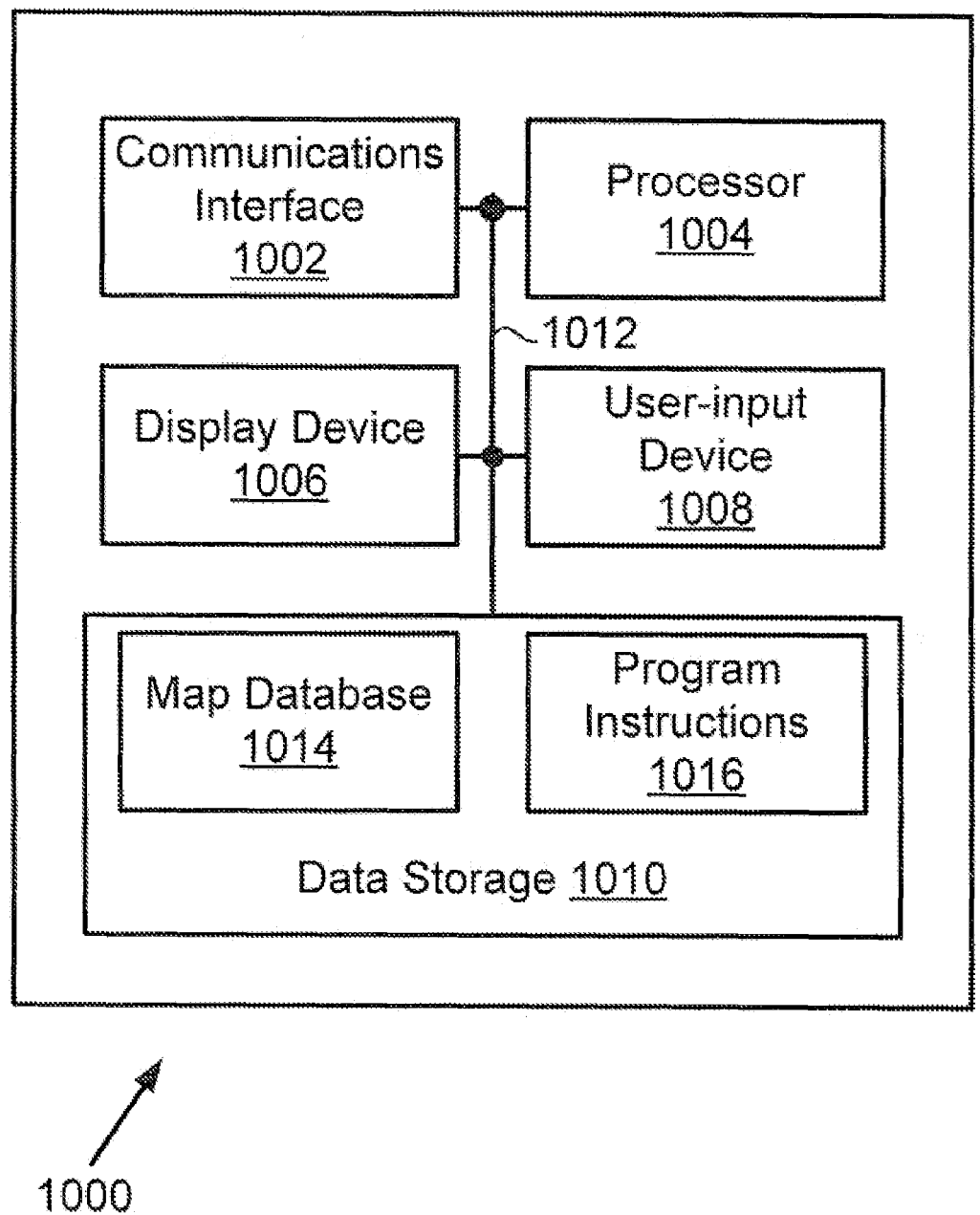
FIG. 17 is a block diagram of another system in accordance with the example embodiments described herein.

As data point device 908 is transported to collect data points, it may generate multiple data points for a common location (e.g., a common latitude, longitude, and altitude) within a given minor 3DR. All of the data point data generated for a common location may be stored in a data storage device, such as data storage device 102. Subsequent to generating and storing multiple data points for a common location, a user may request data point data for the given minor 3DR. In one case, in response to the data point request, the user's system may receive a response that includes the multiple data points generated for the common location. In another case, in response to the data point request, the user's system may receive a response that includes a single data point generated for the common location. In the latter case, the amount of data storage required to store data point data for locations for which multiple data points have been generated is less than if all data points for those locations are sent to the user's system. FIG. 17 illustrates an example data storage device 1010 of the user's system.

A data storage device, such as data storage device 102, may comprise program instructions to use the data points generated by data point device 908 (e.g., LIDAR data points) to create data that defines a 3DR, such as the minor 3DRs shown in FIG. 10. Execution of those program instructions can cause automatic generation of the 3DRs. The program instructions are not so limited though, as the program instructions may include instructions that are executable to allow a user to manually define 3DRs and to generate data that defines those user-defined 3DRs. Each minor 3DR created by the execution of such program instructions may be a 3D representation of a cloud of data points, such as a LIDAR point cloud. Since the 3D representation is approximate, the texturing of images, collected along with the data points, onto a 3DR provides detail to make up for any reduction in resolution caused by approximating a data point cloud with a 3DR.

As illustrated on the left side of FIG. 10, the size (e.g., the volume) of the minor 3DRs being displayed simultaneously for a given object (e.g., all the minor 3DRs for object 802) is identical. In an alternative arrangement, the size of two or more minor 3DRs being displayed simultaneously for a given object may be different.

Also illustrated on the left side of FIG. 10 is a gap between the highest two minor 3DRs of object 804. That gap may exist because a density of data points between those two minor 3DRs is below a density threshold. In an alternative arrangement, one or both of the highest two minor 3DRs may be increased in size so that the highest two minor 3DRs abut one another. In that way, all minor 3DRs for object 804 are contiguous, as are the minor 3DRs for object 802.

Figure 20:
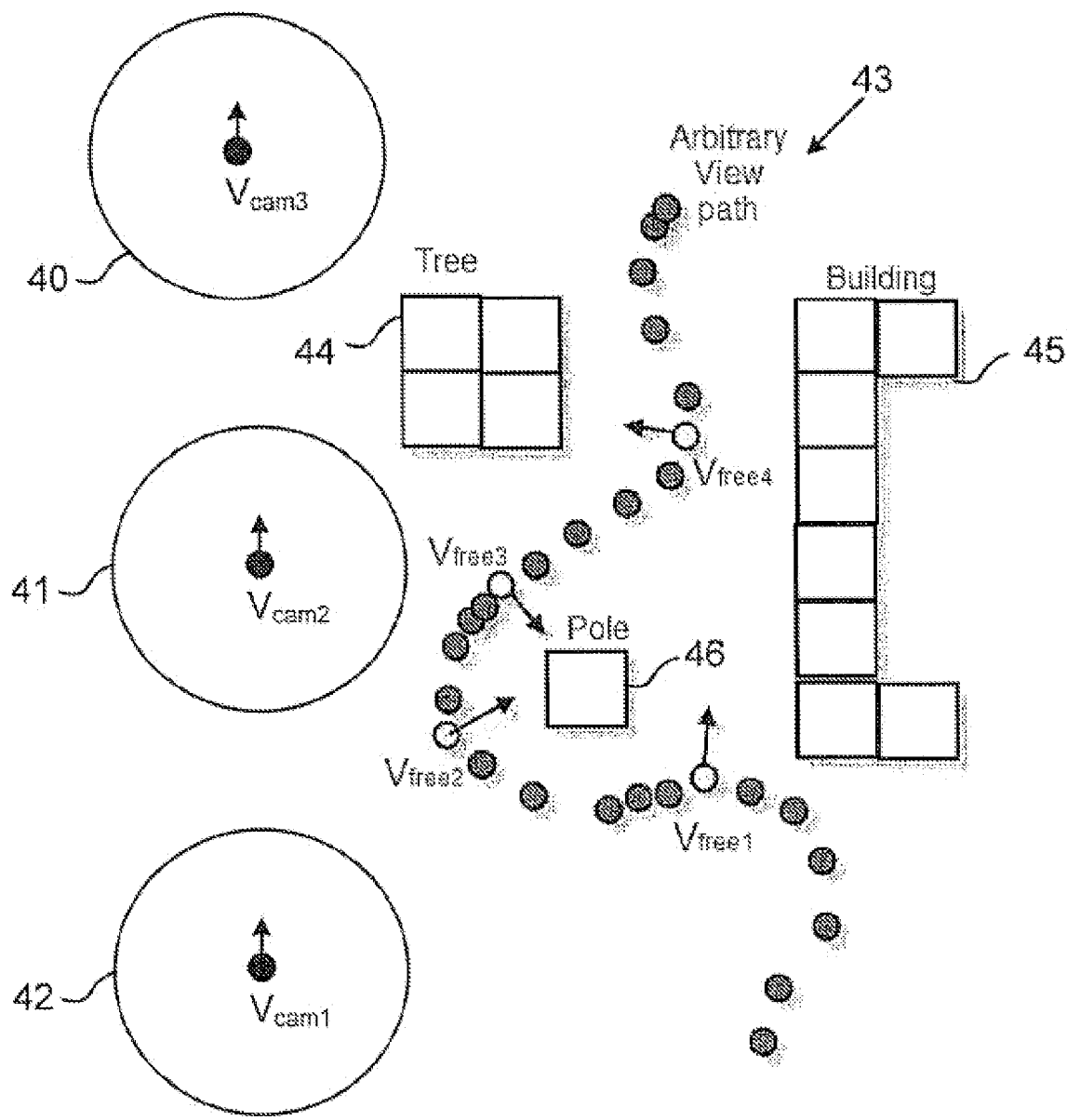
FIG. 20 is a diagram that illustrates various viewpoints in accordance with the example embodiments.

Next, FIG. 20 illustrates various viewpoints in accordance with the example embodiments. In particular, FIG. 20 illustrates image bubble 40, 41, and 42, an arbitrary view path 43, and sets of one or more minor 3DRs 44, 45, and 46 that represent a tree, a building, and a light pole, respectively. In an embodiment in which 3D information is not being used, a user's viewpoints of images from any image bubble, such as image bubbles 40, 41, and 42 may be limited to a viewpoint at the center of those image bubbles. Those viewpoints are identified as Vcam1, Vcam2, and Vcam3, respectively. However, in the embodiments in which 3D information is being used, the user can select viewpoints of 3D objects from viewpoints other than viewpoints at the center of an image bubble. In those latter embodiments, a user may select viewpoints at various locations on a map that includes the 3D information, such as sets of 3DRs 44, 45, and 46. In that regard, the user can traverse an arbitrary view path on the map so as to move freely between the 3D objects. In that way, the user can view the 3D objects from viewpoints outside of an image bubble, such as viewpoints between, behind, over, under, and around 3D objects textured with images. By way of example, such viewpoints may include the viewpoints identified as Vfree1, Vfree2, Vfree3, and Vfree4.

Figure 11:
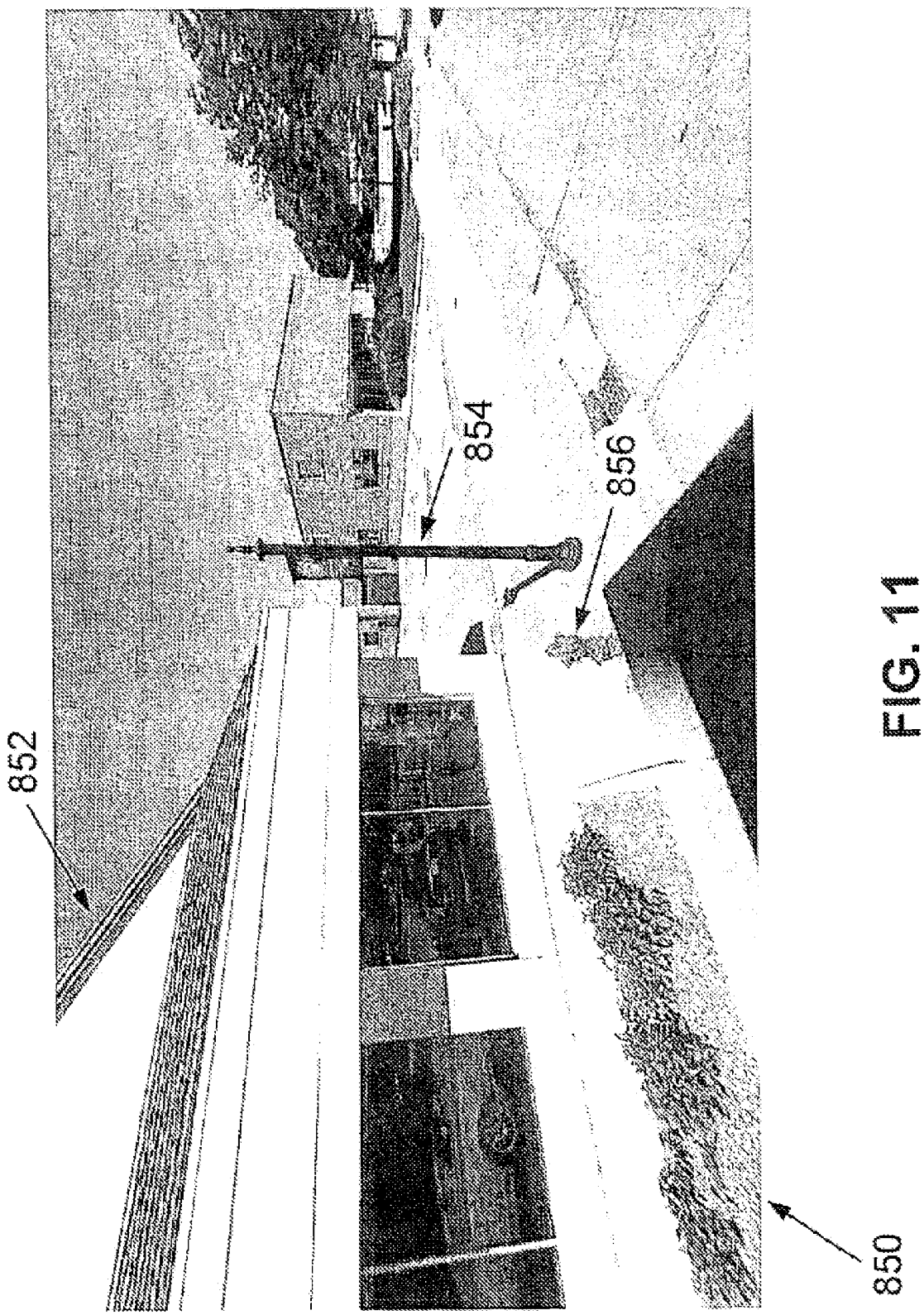
FIG. 11 is an example image captured by an image capturing device.

Next, FIG. 11 is an example image 850 captured by an image capturing device in vehicle 216. In particular, image 850 may have been captured by a left-side camera, a right-side camera, or some other camera on and/or within vehicle 216. Image 850 depicts various 3D objects that can be detected and subsequently represented by one or more 3DRs. The 3D objects in image 850 include, among other things, a building 852, a light post 854, and a fire hydrant 856. Image 850 can be stored within map database 108, and in particular, within an image bubble stored within map database 108. Map database 108 may also store data that indicates a viewpoint of a camera that captured image 850, and the location at which image 850 was captured. For purposes of this description, that image-capture location is referred to as location 850L. The location data for location 850L may be associated with image 850 and other images captured at location 850L. An image bubble can be generated from the images captured at location 850L.

Figure 12:
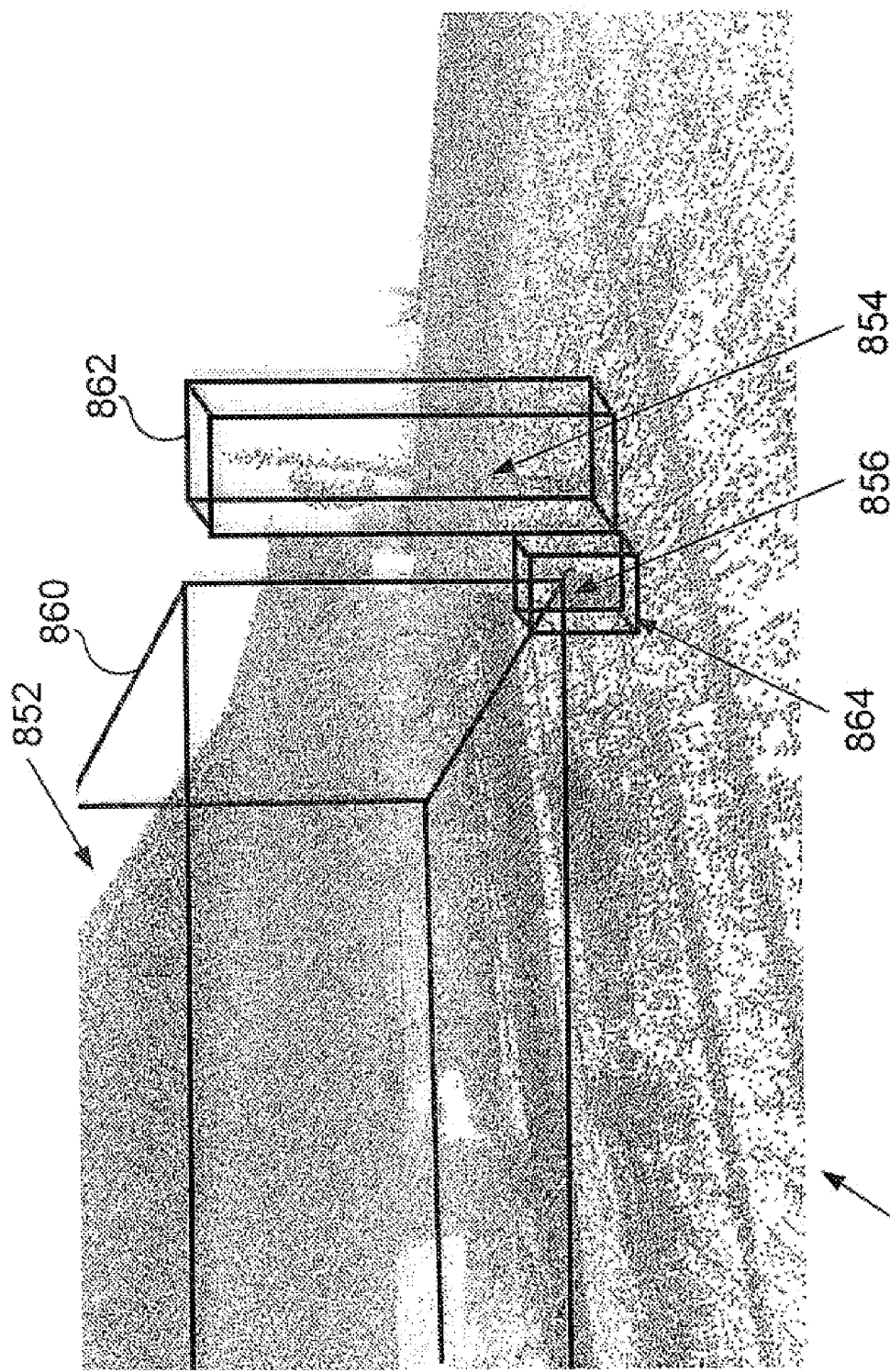
FIG. 12 is a diagram representing a set of data points.

Next, FIG. 12 is a diagram representing a set of object-detection data (or more simply "data points") 858 that may be generated by data point device 908. As an example, data points 858 may be generated by data point device 908 while vehicle 216 is at location 850L. Data points 858 (i.e., the data that defines data points 858) may be stored within map database 108, along with data that associates data points 858 with location 850L.

Processor 105 may execute program instructions 107 to determine particular spaces at which a density of at least some of data points 858 exceeds a density threshold. That execution of program instructions 107 may cause processor 105 to generate minor 3DRs in map database 108. For example, based on data points 858, processor 105 may generate (i) minor 3DR 860 to represent the space at which building 852 is located, (ii) minor 3DR 862 to represent the space at which light post 854 is located, and (iii) minor 3DR 864 to represent the space at which fire hydrant 856 is located.

Minor 3DRs 860, 862, and 864 are displayable on map via display device 104 and may be associated with a major 3DR that is associated with a geographical area in which building 852, light post 854, and fire hydrant 856 are located. Although, building 852, light post 854, and fire hydrant 856 are modeled within a single minor 3DR, the map display resolution can be increased such that one or more of the building 852, light post 854, and fire hydrant 856 is each modeled with multiple minor 3DRs.

Figure 13:
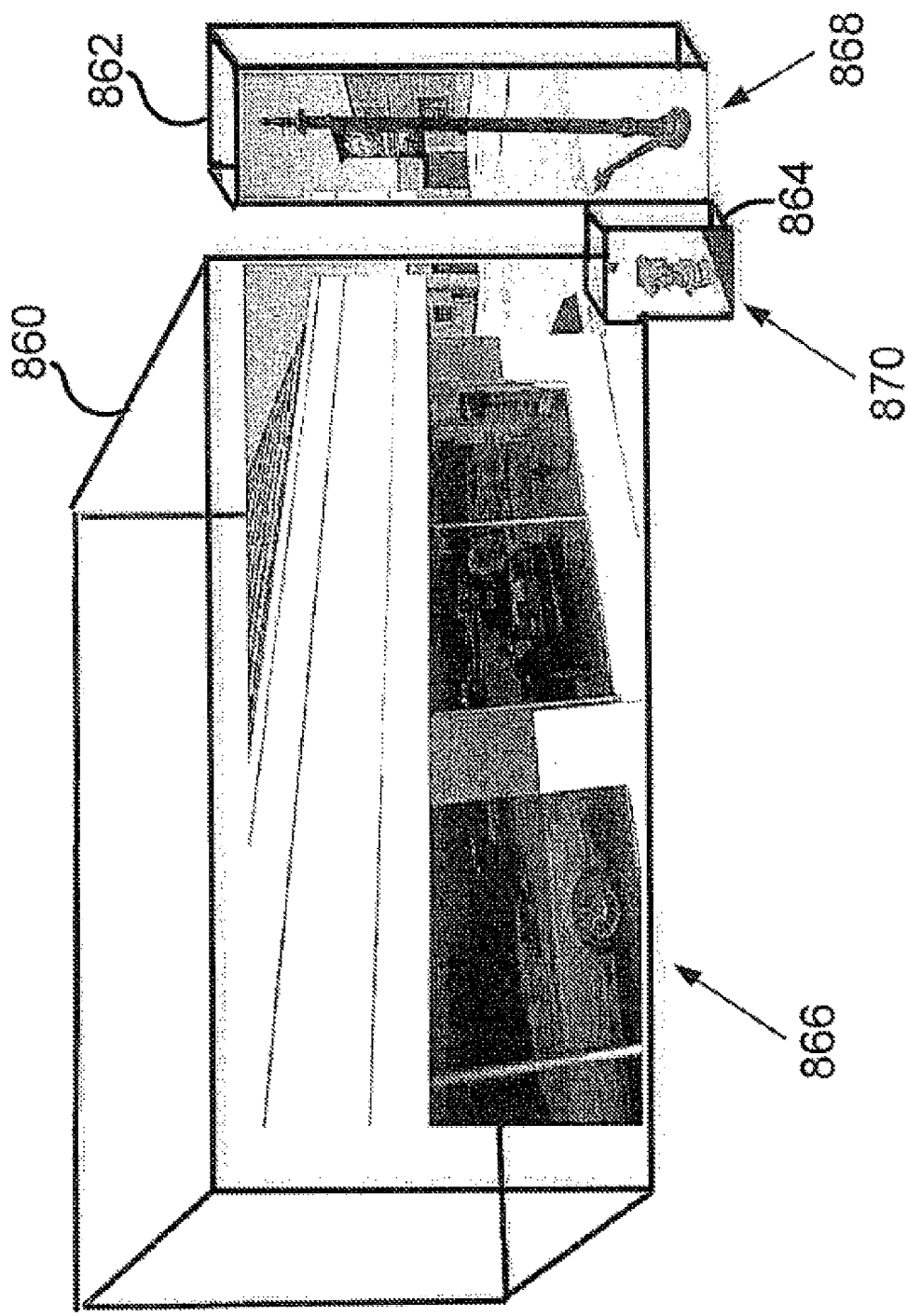
FIG. 13 is a block diagram of minor three-dimensional regions textured with images.

Next, FIG. 13 is a block diagram of minor 3DRs 860, 862, and 864 textured with images 866, 868, and 870, respectively. As illustrated in FIG. 13, minor 3DRs 860, 862, and each comprise a single rectangular prism to represent a 3D object. The images applied to the walls in FIG. 13 may be determined by vectors that pass through an image bubble or bubbles that comprise images 866, 868, and 870. Those vectors may originate, terminate or pass through a surface on minor 3DRs 860, 862, and 864.

One or more other surfaces of a wall, top, or bottom of minor 3DRs 860, 862, and 864 may also be textured with images from an image bubble within map database 108 or from satellite imagery stored within map database 108.

Figure 14:
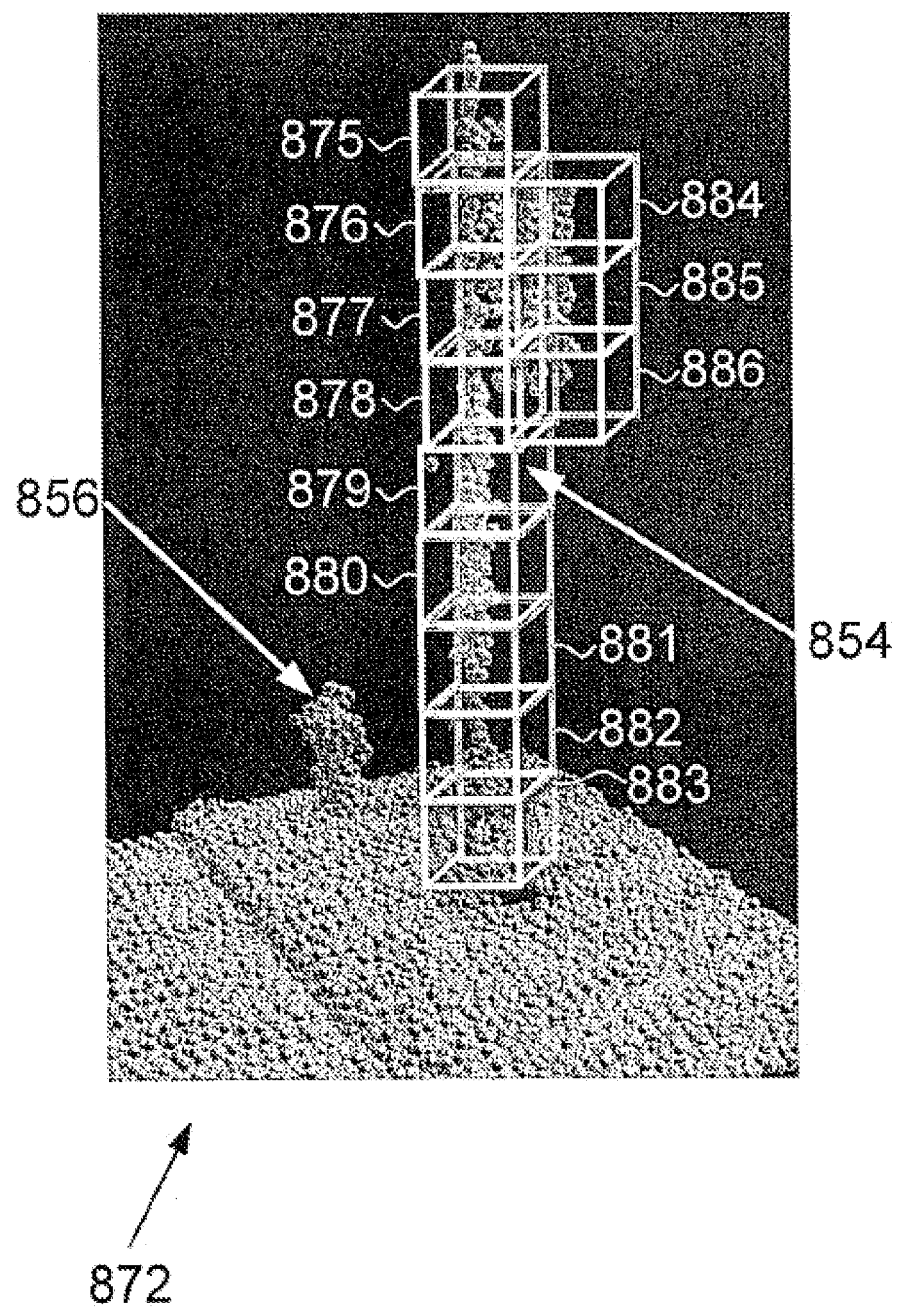
FIG. 14 is a diagram representing another set of data points.

Next, FIG. 14 is a diagram representing another set of object-detection data (or more simply "data points") 872 that may be generated by data point device 908. As an example, data points 872 may comprise LIDAR data points or some other type of data points generated by data point device 908 while vehicle 216 is at a particular location. For purposes of this description, the location at which data points 872 are generated is referred to as location 872L.

While vehicle 216 is at location 872L, an image capturing device within vehicle 216 may capture a plurality of images. The images captured at location 872L, as well as data points 872, may be stored within map database 108, along with data that associates those images and data points 872 with location 872L.

Processor 105 may execute program instructions 107 to determine particular spaces at which a density of at least some of data points 872 exceeds a density threshold. In response, processor 105 may generate minor 3DRs in map database 108. For example, based on data points 872, processor 105 may generate minor 3DRs 875 to 886 so as to represent the spaces at which portions of light post 854 are located.

Each data point within one of minor 3DRs 875 to 886 may be associated (e.g., tagged) with a common identifier that indicates which minor 3DR contains that data point. That identifier can be used by processor 105 to request all data points within a particular 3DR for subsequent analysis and/or display.

Processor 105 may also execute program instructions 107 so as to determine the physical shape of a 3D object, such as light post 854 or fire hydrant 856. The determination of the physical shape of a 3D object can be used by processor 105 to define the size of minor 3DRs. As the resolution of a map display is increased, the size of minor 3DRs may decrease. On the other hand, as the resolution of the map display is decreased, the size of the minor 3DRs may increase until a single minor 3DR represents a single 3D object. By way of example, at the highest resolution, a minor 3DR may represent a real-world volume of 0.0625 cubic meters.

The minor 3DRs without texturing may be displayed via display device 104 for use as a depth map. A depth map model using minor 3DRs (such as cubes) is very efficient in that only a small amount of data is required to associate each minor 3DR with the location represented by that minor 3DR, and each minor 3DR can be loaded with data points generated from a single location, yet images acquired from multiple nearby locations may be used to texture the various surfaces of the minor 3DR.

There are various benefits of associating data points with a 3DR. For example, the presence of a 3D object may be detected by determining that a minor 3DR is associated with a number of data points that equals or exceeds a data point threshold. As another example, the 3D object may be represented by a combination of minor 3DRs that abut at least one other minor 3DR having a number of data points that equals or exceeds the data point threshold. The minor 3DRs that abut one another may comprise a stack of minor 3DRs, a row of minor 3DRs or some combination of at least one stack of minor 3DRs and/or at least one row of minor 3DRs. In FIG. 14, the stack of minor 3DRs 875, 876, 877, 878, 879, 880, 881, 882, and 883 and the stack of minor 3DRs 884, 885, and 886 may be used in defining light post 854. Additionally or alternatively, the row of minor 3DRs 876 and 884, the row of minor 3DRs 877 and 885, and the row of minor 3DRs 878 and 886 may be used in defining light post 854.

Figure 15:
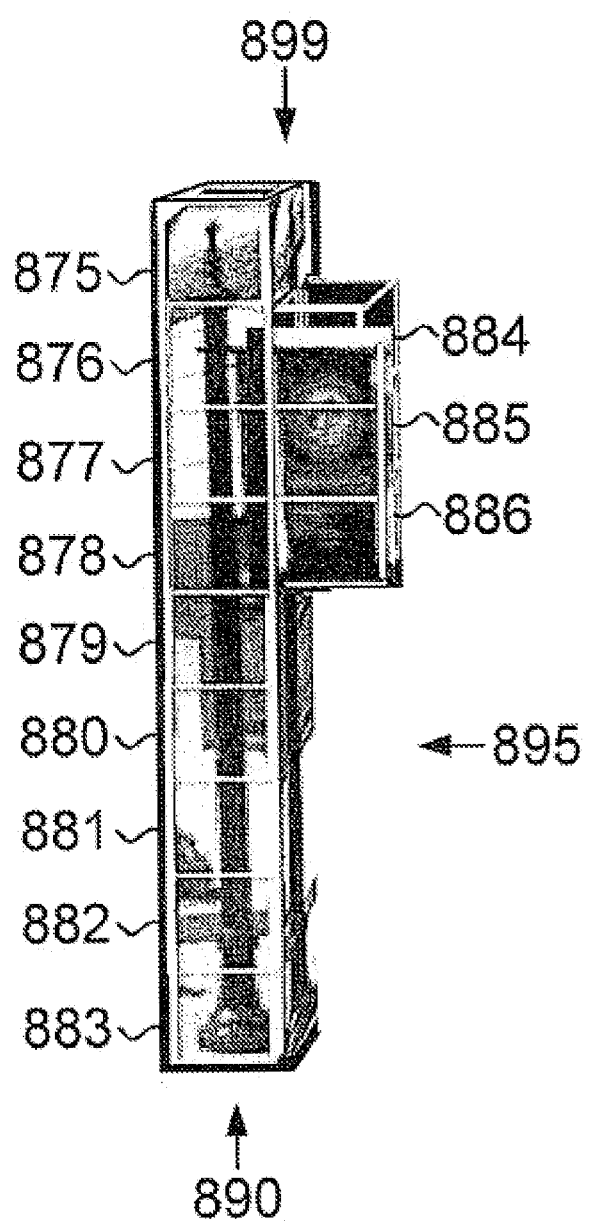
FIG. 15 is a block diagram of minor three-dimensional regions textured with images.

Next, FIG. 15 is a block diagram of minor 3DRs 875 to 886 textured with images. Viewpoint 899 is from above minor 3DRs 875 to 886, whereas viewpoints 890 and 895 are side viewpoints of minor 3DRs 875 to 886. The images textured onto surfaces of minor 3DRs 875 to 886 for a given view may be stored within one or more image bubbles. The top surfaces of minor 3DRs 875 and 884 may be textured with satellite imagery.

As indicated above in the description of FIG. 20, a user may select different viewpoints to view 3D objects. In addition to program instructions that are executable to cause a display device to display different selected viewpoints, the program instructions may include program instructions that are executable to rotate 3DRs being displayed via the display device. Those program instructions may be executed in response to a user selecting one or more 3DRs and a rotation direction, such as left to right, right to left, top to bottom, or bottom to top. The rotation direction may also include a number of degrees to rotate the 3DR, such as 30 degrees, 45 degrees, 90 degrees, or some other number of degrees.

As an example, minor 3DR 886 may be selected for rotating 90 degrees in a bottom to top direction. In that way, the bottom of minor 3DR 886 may be displayed without the user moving the viewpoint to underneath minor 3DR 886. In the event the user requests rotation of a 3DR for which an image is not available, the program instructions may be executable to display an indication that no image is available for showing the 3D object at the requested rotation.

III. Example Architecture

Next, FIG. 16 and FIG. 17 are block diagrams of systems 900 and 1000, respectively. In accordance with an example embodiment, system 900 may be used by map developers such as those employed by NAVTEQ North America, L.L.C., Chicago, Ill., whereas system 1000 may be used by people that access and use the maps developed by the map developers. A plurality of systems arranged like system 1000 may be produced to access and use the maps developed via system 900. The map developers may also use system 1000.

As illustrated in FIG. 16, system 900 includes a map development system 902, vehicle 216, and a communication link 906 that is operable to transfer data between map development system 902 and vehicle 216. Map development system 902 may operate as a server to system 1000.

Communication link 906 may comprise a wired link, a wireless link, or some combination of a wired and wireless link. The data transferred via communication link 906 may comprise data points generated via a data point device 908 and images captured via an image capturing device 910. In addition to or an as an alternative to using communication link 916, the transfer of data between vehicle 216 and map development system 902 may occur via a non-transitory computer-readable medium, such as a compact disc (CD), a digital video disc (DVD), a Blu-Ray disc, or some other type of non-transitory computer-readable medium.

Vehicle 216 is operable to be driven over a road network, and may be operable to be driven off of the road network. As illustrated in FIG. 16, vehicle 216 includes data point device 908, image capturing device 910, and a location device 912. By way of example, vehicle 216 may comprise an automobile, a motorcycle, a bicycle, a self-propelled cart (e.g., a golf cart), a push cart, or some other vehicle capable of transporting data point device 908, image capturing device 910, and location device 912.

System 900 may include multiple vehicles configured like vehicle 216 so as to obtain data points and images from more geographical areas in a shorter amount of time than if just a single vehicle is used. Each of those vehicles may interface to map development system 902 via communication link 906. In accordance with the case in which communication link 906 comprises a wireless link, each of the vehicles may have a respective air interface device to communicate over the wireless link. In an alternative arrangement, data point device 908 and image capturing device 910 may be contained within separate vehicles. Each of those separate vehicles may include a location device 912.

Data point device 908 is operable to generate data points that can be used to indicate presence of an object. Data point device 908 may include a data storage device (not shown) to store the data points until such time that those data points are transferred to map development system 902 and subsequently deleted from the data storage device or overwritten with newly generated data points. Data point device 908 may associate a location determined by location device 912 with the data points collected while the vehicle is at that location.

As an example, data point device 908 may comprise a Light Detection and Ranging ("LIDAR") device that is operable to detect distant objects and determine the locations of those objects based on the characteristics of pulsed laser light reflected from the surfaces of those objects. The LIDAR device may use multiple lasers to generate a cloud of data points representative of distances from the LIDAR device and an intensity of the data points at the various distances. The cloud of data points may comprise a 3D point cloud in which each data point corresponds to a local coordinate, such as x, y, and z. In one embodiment, the LIDAR device is a 64 element LIDAR sensor HDL-64E S2 from Velodyne, Inc., located in Morgan Hill, Calif.

As another example, data point device 908 may comprise a radar device that is operable to detect distant objects and determine the locations of those objects based on the characteristics of high frequency radio waves reflected from the surfaces of those objects. As yet another example, data point device 908 may comprise a 3D stereo imaging device for use in generating the data points that indicate the locations of objects. Other examples of the technologies used to collect the data point that indicate the location of objects are also possible.

Image capturing device (ICD) 910 is operable to capture images. Those images may be captured while vehicle 216 is on or off of a road network. As an example, ICD 910 may comprise the forward camera, the rearward camera, the left-side camera, the right-side camera, the upward camera, and the downward camera that are discussed herein. Other examples of the number of cameras and relative position of those cameras within ICD 910 and/or vehicle 216 are also possible.

ICD 910 may be located within a type of vehicle other than an automobile. For instance, ICD 910 may be located at, on, and/or within a cart (e.g., a push cart or a self-propelled cart). Such a cart can be guided through areas away from a road network such that ICD 910 can capture images at those areas. As an example, those areas away from the road network may comprise areas inside of a structure, such as a shopping mall, school, or airport. As another example, the areas away from a road network may comprise a golf course, a beach, a park, hiking trails, or some other area. The non-automobile vehicle may also include data point device 908 and location device 912.

ICD 910 may comprise a data storage device (not shown) to store the captured images until such time that those images are transferred to map development system 902 and subsequently deleted from the data storage device or overwritten with newly captured images. ICD 910 may associate a location determined by location device 912 with the images captured while the vehicle is at that location. The images captured at each location may be combined to form 360 degree imagery that is arranged and stored as an image bubble.

Location device 912 is operable to repeatedly determine a location of vehicle 216 (e.g., a latitude, longitude, and elevation of vehicle 216) and other information while vehicle 216 is being used to generate data points and capture images. That other information may comprise a velocity and orientation of vehicle 216 and gravitational forces acting upon vehicle 216. As an example, location device 912 may comprise an inertial measurement unit (IMU) that is operable to measure and report any of the other information described above and/or the location of vehicle 216.

As another example, location device 912 may comprise an inertial navigation system (INS) that comprises an IMU and a GPS receiver and related circuitry to measure and report any of the other information located described above and/or the location of vehicle 216. As yet another example, location device 912 may comprise and/or receive data from wheel sensors located, at least in part, on wheels of vehicle 216. As still yet another example, location device 912 may also include a wireless communication receiver, such as a near-field communications receiver, operable inside a structure to obtain data for determining a location of vehicle 216 when vehicle 216 is located within that structure.

Location device 912 may be arranged to provide location data that indicates the vehicle location and any of the other information reportable by an IMU or IMS to data point device 908 and image capturing device 910. The reporting of that location data and other information allows the data and information to be associated with data points and images generated and captured at the vehicle location identified by the location data.

Map development system 902 comprises a communications interface 914, a processor 916, a display device 918, a user-input device 920, and a data storage device 922, all of which may be linked together via a system bus, network, or other connection mechanism 904.

Communications interface 914 may comprise a transceiver that is operable to transmit data to system 1000, and to receive data from system 1000. That transceiver, for example, may comprise a radio frequency ("RF") transceiver for wirelessly receiving, from system 1000, a request for map data stored in a map database 926, and for wirelessly transmitting the requested map data to system 1000. In particular, that transceiver may comprise a network interface card that communicatively couples map development system 902 to a communications network, such as an Ethernet network, or a cable modem that communicatively couples map development system 902 to the Internet via an Internet Service Provider's broadband communication link. Communications interface 914 may also comprise a transceiver that is operable to transmit and receive data via communication link 906.

Processor 916 may comprise one or more general purpose processors (e.g., INTEL microprocessors) and/or one or more special purpose processors (e.g., digital signal processors). Processor 916 may execute program instructions 928 contained within data storage device 922.

Display device 918 may comprise one or more displays that are operable to visually present various data, such as map data contained within map database 926. Each of the one or more displays may comprise a liquid crystal display ("LCD"), a light emitting diode ("LED") display, a plasma display, a cathode ray tube ("CRT") display, or some other type of display. Each of the one or more displays may be located at respective locations remote from one another such that multiple users can simultaneously display the map data. Display device 918 may be arranged as display device 104. In that regard, display device 918 may perform one or more of the functions described herein as being performed by display device 104. In particular, display device 918 may display map 200 and 3DRs on map 200.

User-input device 920 may comprise one or more user-input devices that are operable to input data into map development system 902. Each of the one or more user-input devices may comprise a mouse, a keyboard (e.g., a QWERTY keyboard), a microphone and associated electronic circuitry to detect audible user-inputs, or some other type of user-input device. Each of the one or more user-input devices may be co-located with a display device of display device 918 such that the multiple users can simultaneously enter inputs into map development system 902. User-input device 920 may be arranged as user-input device 108 and perform one or more of the functions described herein as being performed by user-input device 108. As an example, user device 920 may be used to select a geographical area covered by the map data, select a particular major 3DR, and select to display minor 3DRs that are associated with the selected major 3DR.

Data storage device 922 may comprise a non-transitory computer-readable storage medium readable by processor 916. The computer-readable storage medium may comprise volatile and/or non-volatile storage components, such as optical, magnetic, organic or other memory or disc storage, which can be integrated in whole or in part with processor 916. Data storage device 922 may store various data including but not limited to a map database 926 and program instructions 928.

Map database 926 may comprise a variety of map data for generating a map to be displayed via display device 918. As an example, the map data may include data that identifies a road network, data that identifies a plurality of nodes (e.g., nodes 400 and 402) of the road network, and a plurality of road links (e.g., road links 202, 203, and 204) of the road network. The plurality of nodes and road links may be associated with other data, such as data that identifies POI, data that defines 3DRs, and data that defines image bubbles.

Program instructions 928 may comprise a plurality of computer-readable program instructions that are executable by processor 916. Program instructions 928 may comprise program instructions to define major 3DRs and minor 3DRs, associate each of the major 3DRs with a respective geographical area defined within map database 926, and associate each of the minor 3DRS with one of the major 3DRs. As an example, the program instructions may define the major 3DRs to be a 3DR in which one or more road links of the road network are located. As another example, the program instructions may define the minor 3DRs based on a determination that the density of data points collected for a given location exceeds a density threshold.

As yet another example, program instructions 928 may comprise program instructions to partition the surface of a 3DR into multiple portions, such as portions 700 and 702. Those program instructions may detect that an object exists between an image bubble and the un-partitioned surface, such as the inner surface of wall 322. Processor 916 may initially select image bubble 316 for obtaining an image to texture wall 322. Processor 916 may generate a test-vector from the center of image bubble 316 to upper corner of wall 322 (i.e., the corner at which vector 706C contacts) and subsequently determine that the test vector passes through an object (e.g., minor 3DR 310). Processor 916 may then generate vectors 704A, 704B, 704C and 704D as test vectors to determine if any of those vectors pass through an object (other than image bubble 316) before reaching wall 322. If none of vectors 704A, 704B, 704C and 704D pass through an object before reaching wall 322, then processor 916 defines portion 700 for texturing with an image formed by those vectors at the surface of image bubble 316. If one or more of vectors pass through an object (other than image bubble 316) before reaching wall 322, then processor 916 may generate additional test vectors to find a portion of portion 700 that does not obstruct an image projected from image bubble 316. In a similar manner, processor 916 may define portion 702 by determining that none of vectors 706A, 706B, 706C, and 706D pass through an object (other than image bubble 318) before reaching wall 322.

Turning to FIG. 17, system 1000 includes a communications interface 1002, a processor 1004, a display device 1006, a user-input device 1008, and a data storage device 1010, all of which may be linked together via a system bus, network, or other connection mechanism 1012. System 1000 may operate as a client of map development system 902 while map development system 902 is operating as a server.

Communications interface 1002 may comprise a transceiver that is operable to transmit data to map development system 902, and to receive data from map development system 902. That transceiver, for example, may comprise an RF transceiver for wirelessly transmitting, to map development system 902, a request for map data stored in map database 926, and for wirelessly receiving the requested map data from map development system 902. In particular, that transceiver may comprise a network interface card that communicatively couples system 1000 to a communications network, such as an Ethernet network, or a cable modem that communicatively couples system 1000 to the Internet via an Internet Service Provider's broadband communication link. Additionally or alternatively, communications interface 1002 or data storage device 1010 may comprise a disc drive to receive data generated from map development system 902 and stored on a computer-readable disc, such as a CD, DVD, or BR-disc. Other examples of how system 1000 receives data generated by map development system 902 are also possible.

Processor 1004 may comprise one or more general purpose processors (e.g., INTEL microprocessors) and/or one or more special purpose processors (e.g., digital signal processors). Processor 1004 may execute program instructions 1016 contained within data storage device 1010.

Display device 1006 may comprise one or more displays that are operable to visually present various data, such as map data contained within map database 1014. Each of the one or more displays may comprise an LCD, an LED display, a plasma display, a CRT display, or some other type of display. Each of the one or more displays may be located at respective locations remote from one another such that multiple users can simultaneously display the map data. Display device 1006 may be arranged as display device 104. In that regard, display device 1006 may perform one or more of the functions described as being performed by display device 104. In particular, display device 1006 may display map 200 and 3DRs on map 200.

User-input device 1008 may comprise an input device that is operable to input data into system 1000. As an example, user-input device 1008 may comprise a mouse, a keyboard (e.g., a QWERTY keyboard), a microphone and associated electronic circuitry to detect audible user-inputs, or some other type of user-input device. User-input device 1008 may be arranged as user-input device 108 and may perform one or more of the functions described herein as being performed by user-input device 108. As an example, user-input device 1008 may be used to select a geographical area covered by the map data, select a particular major 3DR, and select to display minor 3DRs that are associated with the selected major 3DR.

Data storage device 1010 may comprise a non-transitory computer-readable storage medium readable by processor 1004. The computer-readable storage medium may comprise volatile and/or non-volatile storage components, such as optical, magnetic, organic or other memory or disc storage, which can be integrated in whole or in part with processor 1004. Data storage device 1010 may store various data such as a map database 1014, program instructions 1016, and other types of data.

Map database 1014 may comprise a variety of map data for generating a map to be displayed via display device 1006. As an example, the map data may include data that identifies a road network, data that identifies a plurality of nodes (e.g., nodes 400 and 402) of the road network, and a plurality of road links (e.g., road links 202, 203, and 204) of the road network. The plurality of nodes and road links may be associated with other data, such as data that identifies POI, data that defines 3DRs, and data that defines image bubbles.

In accordance with a first example, map database 1014 may comprise map data that matches the entire set of map data stored in map database 926. In accordance with a second example, map database 1014 may comprise a subset of the map data stored in map database 926. For instance, the subset of map data may not include the data points stored in map database 926. Alternatively, the subset of map data may comprise a single data point for each location of the locations for which map database 926 stores one or more data points.

Table 3 illustrates example inputs that can be received and/or entered via user-input device 1008, and examples of functions that can be carried out by elements of system 1000 in response to user-input device 1008 receiving and/or entering those inputs. Program instructions 1016 may include program instructions that are executable to carry out the system functions shown in Table 3 in response to the System Input associated with those functions. Other examples of program instructions 1016 are also possible. Program instructions 107 and 928 may comprise program instructions similar to program instructions 1016.

TABLE 3

| SYSTEM INPUT | SYSTEM FUNCTION |
| --- | --- |
| Select a geographical location | Retrieve map data from map database for the selected location and cause display device to display a map that shows the selected geographical location |
| Decrease Map Resolution | Display fewer minor 3DRs or display major 3DR instead of displaying minor 3DRs |
| Increase Map Resolution | Display minor 3DRs associated with a major 3DR currently being displayed on display device or display more (smaller) minor 3DRs instead of the current minor 3DRs being displayed on display device |
| Request depth map | Remove textured surfaces of minor 3DRs being displayed on display device and begin displaying, within the non-textured minor 3DRs, data points associated with the minor 3DRs being displayed. |
| Hide depth map | Remove data points being displayed within minor 3DRs and begin displaying the minor 3DRs with their surfaces textured with images associated with those surfaces |
| Select a point-of-interest (POI) for a particular 3DR | Retrieve, from the map database, POI data that is associated with the particular 3DR and display that POI data on the display device |
| Select external viewpoint of a particular major 3DR | Begin displaying outer surfaces of the particular major 3DR instead of displaying minor 3DR(s) associated with the particular major 3DR |
| Select internal viewpoint of a particular major 3DR | Begin displaying minor 3DR(s) associated with the particular major 3DR instead of displaying outer surfaces of the particular major 3DR. Internal surfaces of the particular major 3DR may be displayed as a backdrop to the minor 3DR(s) being displayed. |

TABLE 3-continued

| SYSTEM INPUT | SYSTEM FUNCTION |
| --- | --- |
| Select a point on a surface of a 3DR | Display a latitude, longitude, and altitude (or elevation) of the selected point. |
| Select 3DR labeling | Display one or more 2D labels on 3D objects currently being displayed, each label indicating information regarding the labeled 3D object (e.g., address, doorways, business name operating at address). |
| Show 3DR boundary lines | Remove boundary lines of each 3DR currently being displayed on the display device |
| Hide 3DR boundary lines | Add boundary lines to each 3DR currently being displayed on the display device |

Figure 19:
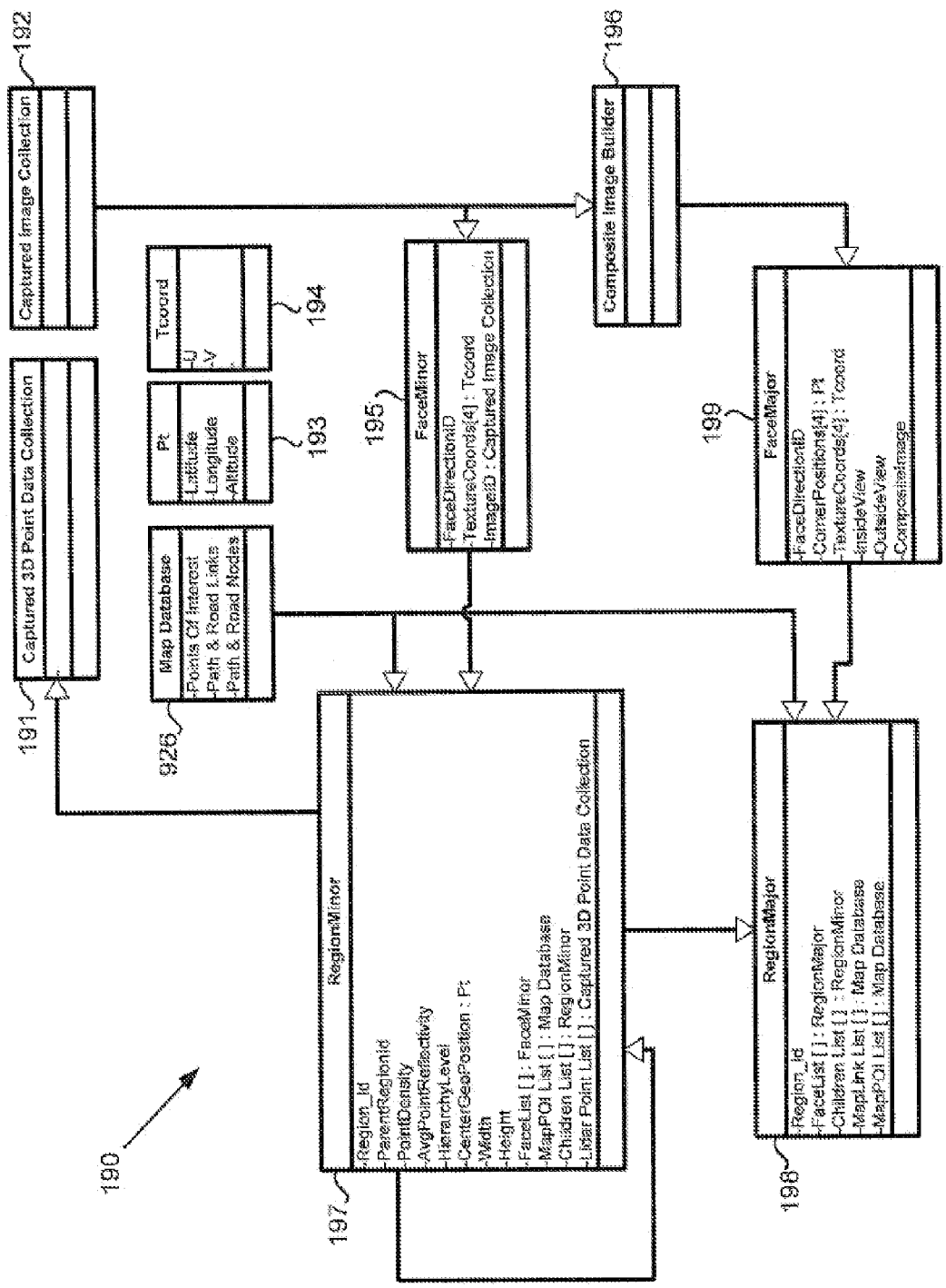
FIG. 19 is an example file structure for data storable in a computer-readable data storage device.

Next, FIG. 19 illustrates an example file structure 190 storable in a computer-readable data storage device, such as data storage device 102, 922, or 1010, or a data storage device within vehicle 216. File structure 190 comprises captured 3D point data collection 191, Captured Image Collection 192, map data base 926, point data (Pt) 193, texture coordinate data (Tcoord data) 194, face minor records (FaceMinor) 195, a composite image builder 196, minor region records (RegionMinor) 197, major region records (RegionMajor) 198, and major face records (FaceMajor) 199.

3D point data collection 191 may comprise the data that represents data points generated by data point device 908. Point data 193 illustrates an example of data that may be used to represent each data point of 3D point data collection 191. In addition to point data 193, 3D point data collection 191 may identify other data collection image for each data point, such as, but not limited to, (i) a distance between the data point and the data point device 908, (ii) an angle of a laser within data point device 908, (iii) an angle of a laser receptor within data point device 908, (iv) a velocity of vehicle 216, and (v) a location of vehicle 216.

Captured image collection 192 may comprise the images captured by image capturing device 910 as well as data that identifies each image so that the image can be recalled from captured image collection 192 for texturing onto a 3DR. Captured image collection 192 may comprise composite images generated by composite image builder 196.

Major region records 198 may comprise a record for each major 3DR. FIG. 19 illustrates example data that may be contained in each major region record. Some of that data may include a major face record contained within major face records 199. FIG. 19 illustrates example data that may be contained in each major face record.

Minor region records 197 may comprise a record for each minor 3DR. FIG. 19 illustrates example data that may be contained in each minor region record. Some of that data may include a minor face record contained within minor face records 195. FIG. 19 illustrates example data that may be contained in each minor face record.

Figure 22:
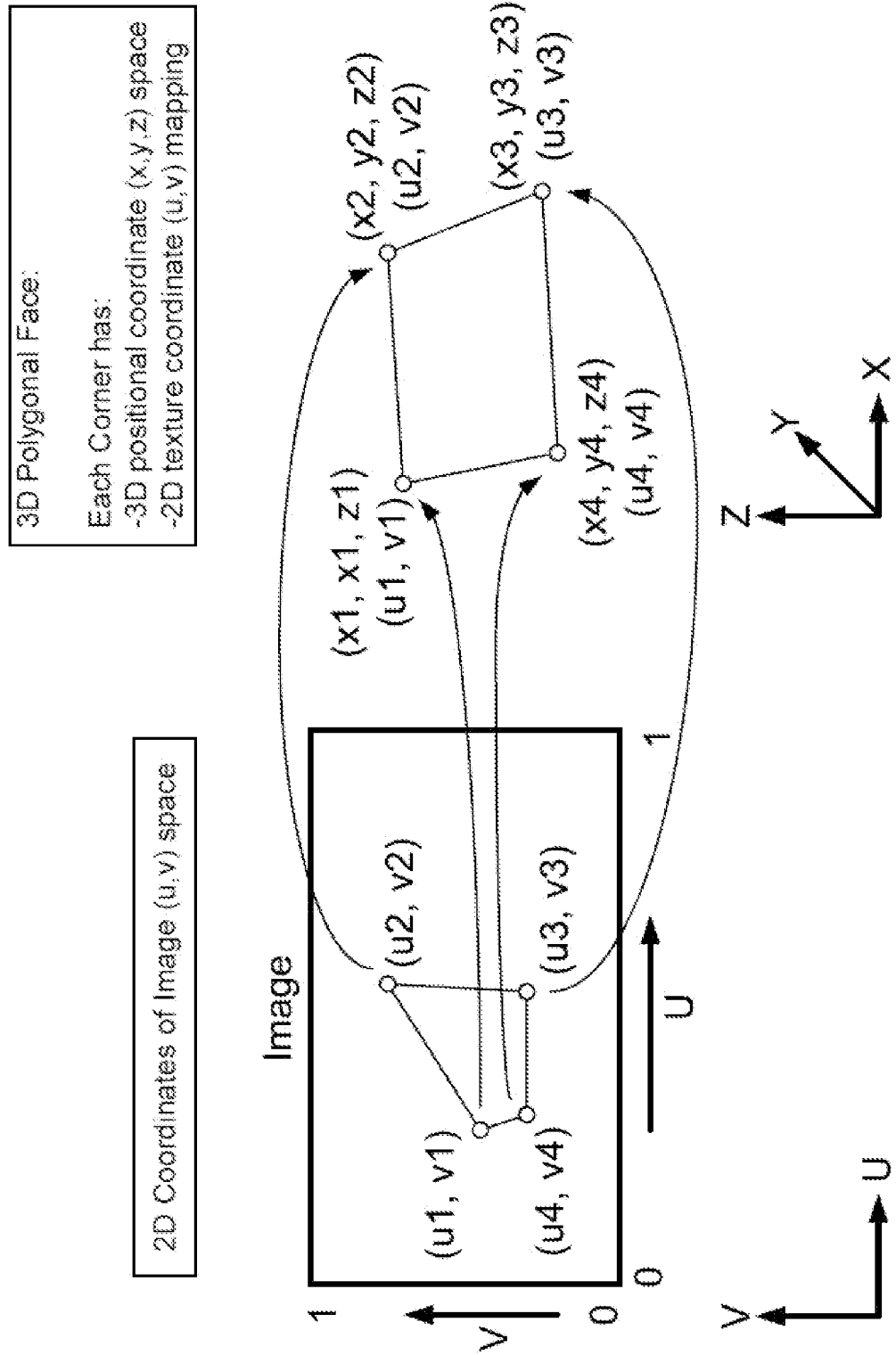
FIG. 22 is a diagram that illustrates mapping a two-dimensional image region onto a three-dimensional polygon using texture coordinates.

Tcoord data 194 comprises data representing 2D texture coordinates for mapping an image to each corner of a 3DR surface (e.g., a 3DR face). Each texture coordinate pair may specify (u, v) coordinates associated with an image. As an example, the values of u and v may be 0, 1 or a value between 0 and 1. FIG. 22 illustrates mapping a 2D image region onto a 3D polygon using texture coordinates. The surface of each 3DR may be defined in the (x, y, z) space. Each corner of a 3D polygon may be defined by a 3D positional coordinate in (x, y, z) space and be mapped to a 2D texture coordinate in the (u, v) space. Each face minor record 195 and each face major record 196 may comprise four texture coordinates.

Composite image builder 196 may comprise program instructions for determining two or more images to combine into a composite image to be textured onto the surface of a 3DR. Composite image builder 196 may comprise data that defines each composite image as well as data that identifies each composite image so that the composite image can be recalled from captured image collection 192 for texturing onto a 3DR.

IV. Example Operation

Figure 18:
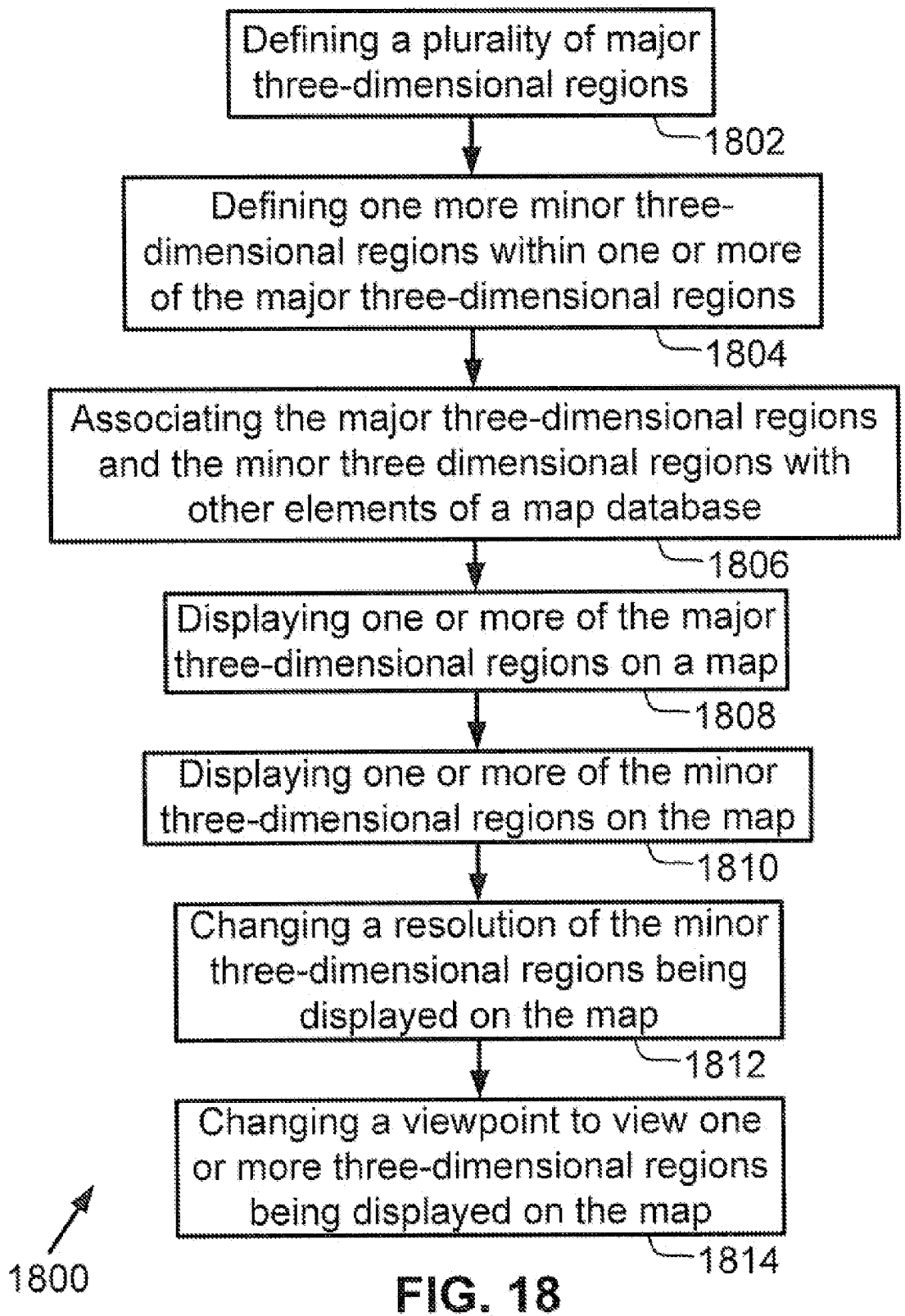
FIG. 18 is a flow chart depicting a set of functions that may be carried out in accordance with the example embodiments.

Next, FIG. 18 is a flow chart depicting a set of functions 1800 that may be performed in accordance with the example embodiments. Fewer, more, or different functions, steps or acts may be provided, and a combination of functions or steps may be provided. Also, the functions or steps may be performed in the order as shown or in a different order. The method is implemented by one or more systems and/or devices described herein or by different devices or systems. One or more steps or processes of the method may be fully or partially automated (such as via a computer, processor, and/or algorithm).

Block 1802 includes defining a plurality of major three-dimensional regions ("major 3DRs"). Defining the plurality of major 3DRs may include processor 916 executing program instructions 928 to define each major 3DR. As an example, processor 916 may define one or more major 3DRs based on road links defined in map database 926. For instance, each major 3DR may be defined for some number of contiguous road links that have a length that equals or exceeds a threshold length. As another example, processor 916 may define the major 3DRs based on the data points generated by data point device 908. For instance, one or more major 3DRs may be based on processor 916 determining that a density of data points within a given volume of space meets or exceeds a threshold density of data points. Other examples of defining major 3DRs are also possible.

Defining each major 3DR may comprise defining a top, bottom, and a number of walls that extend between the edges of the top and bottom. In that regard, each major 3DR may be defined as a rectangular prism, such as a cube. Alternatively, one or more major 3DRs may be defined as some other geometric shape.

Defining each major 3DR may also comprise defining an inner and outer surface for each top, bottom, and wall defined for the major 3DR. Furthermore, defining each major 3DR may comprise defining dimensions for each top, bottom, and wall defined for the major 3DR and/or location information that allows each defined major 3DR to be displayed on a map when the map is illustrating a location associated with that major 3DR.

Upon defining each major 3DR or upon defining the plurality of major 3DRs, that major 3DR or those major 3DRs may be stored in a computer-readable data storage device such as data storage device 922, and in particular, stored in a map database, such as map database 926. The data that defines each major 3DR may comprise a major region record 198, multiple major face records 199, and other data of file structure 190.

Next, block 1804 includes defining one or more minor three-dimensional regions ("minor 3DRs") within one or more of the major three-dimensional regions. In an example embodiment, each minor 3DR is defined to be within a single major 3DR.

Processor 916 may execute program instructions 928 to carry out defining each minor 3DR. As an example, processor 916 may define one or more minor 3DRs based on a determination that a given volume of space within a major 3DR is associated with a number of data points generated by data point device 908 that exceeds a density threshold. As another example, processor 916 may define one or more minor 3DRs from images captured by image capturing device 910. In that regard, processor 916 may detect that a common object appears in multiple images and generate one or more minor 3DRs for that detected object. Other examples of defining minor 3DRs are also possible.

As another example, processor 916 may partition a major 3DR into a plurality of 3DRs, and determine whether a density of data points within each of those 3DRs equals or exceeds a density threshold. If processor 916 determines that the density of data points within a 3DR equals or exceeds the density threshold, then processor 916 defines that 3DR as a minor 3DR. On the other hand, if processor 916 determines that the density of data points with a 3DR does not equal or exceed the density threshold, then processor 916 may drop (e.g., discard or ignore) that 3DR from consideration as being a minor 3DR. By dropping a 3DR, processor 916 has determined that an object is not located within the dropped 3DR.

Partitioning a major 3DR into a plurality of minor 3DRs may be carried in various ways. In one respect, the major 3DR may be partitioned into a number of 3DRs that are the smallest size of 3DRs defined for use by map development system 902. In another respect, the major 3DR may be partitioned into minor 3DRs that are a size greater than various ways. In one respect, the major 3DR may be partitioned into a number of 3DRs that are the smallest size of 3DRs defined for use by map development system 902.

Defining each minor 3DR may comprise defining a top, bottom, and a number of walls that extend between the edges of the top and bottom. In that regard, each minor 3DR may be defined as a rectangular prism, such as a cube. Alternatively, one or more minor 3DRs may be defined as some other geometric shape.

Defining each minor 3DR may also comprise defining an inner and outer surface for each top, bottom, and wall defined for the minor 3DR. Furthermore, defining each minor 3DR may comprise defining dimensions for each top, bottom, and wall defined for the minor 3DR and/or location information that allows each defined minor 3DR to be displayed on a map when the map is illustrating a location associated with a major 3DR that includes and/or is associated with that minor 3DR.

Upon defining each minor 3DR or upon defining a plurality of minor 3DRs, that minor 3DR or those minor 3DRs may be stored in a computer-readable data storage device such as data storage device 922, and in particular, stored in a map database, such as map database 926. The data that defines each minor 3DR may comprise a minor region record 197, multiple minor face records 195, and other data of file structure 190.

Defining the one or more minor 3DRs may also comprise recursively (e.g. repeatedly) subdividing a minor 3DR or some level of a sub-level 3DR so as to define a plurality of sub-level minor 3DRs at a next sub-level (i.e., a level in which a size of the resulting 3DRs is smaller than a size of the 3DR that is subdivided). Each sub-level minor 3DR may be defined to have a top, bottom, and a number of walls extending between the edges of the top and bottom, dimension information that defines dimensions of each top, bottom, and wall of the 3DR, and location information that defines the location of the 3DR.

Upon defining each sub-level minor 3DR or upon defining a plurality of sub-level minor 3DRs, that sub-level minor 3DR or those sub-level minor 3DRs may be stored in a computer-readable data storage device such as data storage device 922, and in particular, stored in a map database, such as map database 926.

Furthermore, upon defining minor 3DRs and one or more sub-levels of minor 3DRS, processor 916 may analyze the defined minor 3DRS and sub-levels of minor 3DRS to detect presence of an object. Such detection may be carried out by determining that a plurality of minor 3DRs are stacked in a column, such as minor 3DRs. 875 to 883. Additionally or alternatively, such detection may be carried out by determining that a plurality of minor 3DRs are arranged in a row, such as minor 3DRs 876 and 885. In other word, such detection may be carried out by determining that a set of minor 3DRs are contiguous.

Furthermore still, upon determining that a plurality of minor 3DRs indicate presence of an object, some or all of those minor 3DRs may be combined into one or more larger minor 3DRs. The larger minor 3DRs may be displayed when an object represented by those minor 3DRs is within the geographic area being displayed on a map, but is at a location that exceeds a threshold distance from the current viewpoint selected for the map.

Next, block 1806 includes associating the major three-dimensional regions and the minor three-dimensional regions with other elements of a map database. Associating those elements (e.g., data) and 3DRs can reduce the processing burden to locate data that is to be displayed on a map when a particular geographical location is selected for display. Associating the data may be carried out by a processor, such as one of processors 105, 916, and 1004, executing program instructions.

As an example, the other elements of the map database may include POI data, image information that identifies which image is associated with a particular surface of a 3DR or portion of a surface of a 3DR, data points collected via data point device 908, data that identifies a road link of a road network, and data that identifies a node of the road network. Other examples of the map database elements that are associated with a major or minor 3DR are also possible.

Next, block 1808 includes displaying one or more of the major three-dimensional regions on a map. The map and the major 3DRs may be displayed on any of display devices 104, 918, and 1006. While the 3DR(s) are displayed on the display device, a user may enter a selection to display data points. In response to entering that selection, program instructions may be executed to retrieve data that identifies which data points are located within the displayed 3DR(s) and cause those data points to be displayed within the 3DR(s) being displayed. Furthermore, while data points are being displayed within the 3DR(s), a user may enter a selection to stop displaying data points. In response to entering that latter selection, program instructions may be executed to cause the displayed data points to be removed from the display device such that the display device displays the 3DR(s) without any data points.

In accordance with an embodiment, in which display device 104 displays the major 3DR(s) and map, processor 105 may execute program instructions 107 to (i) interpret a map selection (e.g., a selection of a particular geographical location) entered via user-input device 106, (ii) retrieve map data, based on the map selection, from map database 108, and (iii) cause display device 104 to display the retrieved map data, which includes data for displaying the one or more major 3DRs.

In accordance with an embodiment, in which display device 918 displays the major 3DR(s) and map, processor 916 may execute program instructions 928 to (i) interpret a map selection (e.g., a selection of a particular geographical location) entered via user-input device 920, (ii) retrieve map data, based on the map selection, from map database 926, and (iii)

cause display device 918 to display the retrieved map data, which includes data for displaying the one or more major 3DRs.

In accordance with an embodiment, in which display device 1006 displays the major 3DR(s) and map, processor 1004 may execute program instructions 1016 to (i) interpret a map selection (e.g., a selection of a particular geographical location) entered via user-input device 1008, (ii) retrieve map data, based on the map selection, from map database 1014, and (iii) cause display device 1006 to display the retrieved map data, which includes data for displaying the one or more major 3DRs.

Next, block 1810 includes displaying one or more of the minor three-dimensional regions on the map. The map and the minor 3DR(s) may be displayed on any of display devices 104, 918, and 1006. Displaying the minor 3DR(s) may be carried out in response to receiving a user-input to select a view inside a major 3DR that includes and/or associated with the 3DR(s).

While the minor 3DR(s) are displayed on the display device, a user may enter a selection to display data points. In response to entering that selection, program instructions may be executed to retrieve data that identifies which data points are located within the minor 3DR(s) being displayed and cause those data points to be displayed within the minor 3DR(s) being displayed. Furthermore, while data points are being displayed within the minor 3DRs, a user may enter a selection to stop displaying data points. In response to entering that latter selection, program instructions may be executed to cause the displayed data points to be removed from the display device such that the display device displays the minor 3DR(s) without any data points.

In accordance with an embodiment, in which display device 104 displays the minor 3DR(s) and map, processor 105 may execute program instructions 107 to (i) interpret a user-input entered via user-input device 106, (ii) retrieve map data, based on the user-input, from map database 108, and (iii) cause display device 104 to display the retrieved map data, which includes data for displaying the minor 3DR(s).

In accordance with an embodiment, in which display device 918 displays the minor 3DR(s) and map, processor 916 may execute program instructions 928 to (i) interpret a user-input entered via user-input device 920, (ii) retrieve map data, based on the user-input, from map database 926, and (iii) cause display device 918 to display the retrieved map data, which includes data for displaying the minor 3DR(s)

In accordance with an embodiment, in which display device 1006 displays the minor 3DR(s) and map, processor 1004 may execute program instructions 1016 to (i) interpret a user-input entered via user-input device 1008, (ii) retrieve map data, based on the user-input, from map database 1014, and (iii) cause display device 1006 to display the retrieved map data, which includes data for displaying the minor 3DR(s)

Next, block 1812 includes changing a resolution of the minor three-dimensional regions being displayed on the map. Changing the resolution of the minor 3DRs being displayed may be carried out in response to receiving a user-input to increase or decrease the resolution of the map. The user-input may be entered via any of user-input devices 106, 920, and 1008. Changing the display of minor 3DRs, such as changing from the right side of FIG. 10 to left side of FIG. 10, to display more minor 3DRs for a given geographical area is an example of increasing the resolution of the displayed minor 3DRs. On the other hand, changing the display of minor 3DRs, such as changing from the left side of FIG. 10 to right side of FIG. 10, to display fewer minor 3DRs for a given geographical area is an example of decreasing the resolution of the displayed minor 3DRs.

In accordance with an embodiment, in which the resolution of a map displayed on display device 104 is changed, processor 105 may execute program instructions 107 to (i) interpret a user-input entered via user-input device 106, (ii) retrieve map data, based on the user-input, from map database 108, and (iii) cause display device 104 to display the map with higher or lower resolution.

In accordance with an embodiment, in which the resolution of a map displayed on display device 918 is changed, processor 916 may execute program instructions 928 to (i) interpret a user-input entered via user-input device 920, (ii) retrieve map data, based on the user-input, from map database 926, and (iii) cause display device 918 to display the map with higher or lower resolution.

In accordance with an embodiment, in which the resolution of a map displayed on display device 1006 is changed, processor 1004 may execute program instructions 1016 to (i) interpret a user-input entered via user-input device 1008, (ii) retrieve map data, based on the user-input, from map database 1014, and (iii) cause display device 1006 to display the map with higher or lower resolution.

Next, block 1814 includes changing a viewpoint to view one or more three-dimensional regions being displayed on the map. As an example, changing the viewpoint may include moving the viewpoint between, behind, over, under, and around 3D objects being displayed on the map. As another example, changing the viewpoint may include moving 360 degrees around the 3D object.

In addition to or as an alternative to changing the viewpoint of one or more 3DRs, one or more 3DRs may be selected and rotated, such as in one or more directions. For example, one or more 3DRs may be rotated (such as clockwise, counterclockwise, or in any other orientation) to view different sides of the respective 3DR. In that way, an image or images textured onto the rotated 3DRs may be displayed without changing the user's viewpoint. Alternatively, the rotation may also be considered a change in viewpoint. The 3DRs that are being displayed but are not selected for rotation may continue to be displayed from the user's viewpoint.

The logic, data, software, or instructions for implementing the systems, processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts, steps, or tasks illustrated in the figures or described herein are executed in response to one or more sets of logic or computer-executable instructions stored in or on computer readable storage media (such as non-transitory media). The functions, acts or tasks may be independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

It is intended that the foregoing detailed description be regarded as illustrative rather than limiting and that it is understood that the following claims including all equivalents are intended to define the scope of the invention.

I claim:

1. A method for displaying a map with three-dimensional features, the method comprising:

defining a plurality of major three-dimensional regions (major 3DRs) and associating each major 3DR with a respective geographical area defined for a map stored in a computer-readable map database, wherein each major 3DR comprises a top, a bottom, and multiple sides to form a rectangular prism, and wherein each top, bottom, and side of each major 3DR comprises at least one surface;

displaying, via a display device, one or more of the major 3DRs upon the map, wherein at least one surface of each major 3DR being displayed is textured with images captured via a plurality of imaging devices and each of the plurality of imaging devices faced away from a different side of a vehicle, and wherein the image textured onto each surface comprises an image captured by the imaging device when capturing images in a direction of that surface;

associating one or more sets of data points with a first major 3DR of the plurality of major 3DRs, wherein each set of data points associated with the first major 3DR indicates presence of one or more objects at points in space on or above the geographical area associated with the first major 3DR;

defining one or more minor three-dimensional regions (minor 3DRs) for the first major 3DR, wherein each minor 3DR defined for the first major 3DR pertains to a portion of the first major 3DR at which a density of data points of a set of data points associated with the first major 3DR equals or exceeds a density threshold, wherein each minor 3DR defined for the first major 3DR comprises at least a top, a bottom, and multiple sides; and displaying, via the display device, the one or more minor 3DRs defined for the first major 3DR, wherein at least the top, the bottom, or one of the multiple sides of each minor 3DR, defined for the first major 3DR, being displayed has one or more images textured onto that top, bottom, or side, and wherein the one or more images textured onto each top, bottom, or side of a minor 3DR are images that are visible from a location where the image was captured when looking in the direction of that top, bottom, or side.

2. The method of claim 1, wherein at least a portion of the data points within the one or more sets of data points are generated by a LIDAR device, a three-dimensional stereo camera imaging device, or a radar device.

3. The method of claim 1, wherein each surface of any major 3DR being displayed via the display device and each surface of any minor 3DR being displayed via the display device is outlined with a wireframe.

4. The method of claim 1, wherein the top of at least one major 3DR of the plurality of major 3DRs comprises a top inner surface and a top outer surface, and each of the multiple sides of the at least one major 3DR comprises a respective inner side surface and a respective outer side surface.

5. The method of claim 4, further comprising:

receiving an input to trigger the display device from displaying at least one of the inner surfaces of the first major 3DR to displaying at least one of the outer surfaces of the first major 3DR, wherein, while the display device displays the at least one of the inner surfaces of the first major 3DR, the display device does not display any of the outer surfaces of the first major 3DR, and while the display device displays the at least one of the outer surfaces of the first major 3DR, the display device does not display any of the inner surfaces of the first major 3DR.

6. The method of claim 4, further comprising:

receiving an input to trigger the display device from displaying at least one of the outer surfaces of the first major 3DR to displaying at least one of the inner surfaces of the first major 3DR, wherein, while the display device displays the at least one of the inner surfaces of the first major 3DR, the display device does not display any of the outer surfaces of the first major 3DR, and while the display device displays the at least one of the outer surfaces of the first major 3DR, the display device does not display any of the inner surfaces of the first major 3DR.

7. A computer-readable data storage device for use in creating a map with three-dimensional features, the data storage device comprising:

a set of object-detection data generated for each of one or more locations, wherein each set of object-detection data comprises a plurality of data points and each data point is associated with a particular location remote from the location for which the set of object-detection data was generated;

a plurality of images and location data that identifies a viewpoint and location from which each image was captured, wherein the viewpoint is from a side of a vehicle;

computer-readable program instructions executable by a processor to identify, from among the object-detection data, data points that indicate presence of a three-dimensional (3D) object at a particular location and to define a major 3D region (3DR) associated with the 3D object and the particular location, wherein the major 3DR comprises a plurality of surfaces, and wherein the major 3DR is larger than the 3D object;

computer-readable program instructions executable by the processor to determine, for each surface of the major 3DR and from among the plurality of images, a respective image to be associated with that surface, wherein each of the plurality of surfaces is associated with a different image; and computer-readable program instructions executable by the processor to create, within the data storage device, association data that identifies each association between each surface of the major 3DR and the respective image associated with that surface;

computer-readable program instructions executable by the processor to define one or more minor 3DRs for the major 3DR, wherein each minor 3DR defined for the major 3DR pertains to a portion of the major 3DR at which a density of data points of a set of data points associated with the major 3DR equals or exceeds a density threshold, wherein each minor 3DR defined for the major 3DR comprises at least a top, a bottom, and multiple sides; and computer-readable program instructions executable by the processor to display, via the display device, the one or more minor 3DRs defined for the major 3DR, wherein at least the top, the bottom, or one of the multiple sides of each minor 3DR, defined for the major 3DR, being displayed has one or more images textured onto that top, bottom, or side, and wherein the one or more images textured onto each top, bottom, or side of a minor 3DR are images that are visible from a location where the image was captured when looking in the direction of that top, bottom, or side.

8. The computer-readable data storage device of claim 7, wherein the data points that indicate presence of a 3D object are generated by a data point device located on the vehicle while the vehicle is at a first location,
wherein at least one image associated with a surface of the major 3DR comprises an image captured by an image capturing device located on the vehicle while the vehicle is at a second location, and
wherein at least one other image associated with a surface of the major 3DR comprises an image capture by the image capturing device while the vehicle is at a third location.

9. The computer-readable data storage device of claim 7, wherein the data points that indicate presence of a 3D object are generated by a data point device located on a vehicle while the vehicle is at a first location,
wherein at least one image associated with a surface of the major 3DR comprises an image captured by an image capturing device located on the vehicle while the vehicle is at the first location, and
wherein at least one other image associated with a surface of the major 3DR comprises an image capture by the image capturing device while the vehicle is at a second location.

10. The computer-readable data storage device of claim 9, wherein the data points that indicate presence of a 3D object comprise LIDAR data points.

11. The computer-readable data storage device of claim 7, wherein the data points that indicate presence of a 3D object are generated by a data point device located on a vehicle while the vehicle is at a first location, and
wherein each image associated with a surface of the major 3DR comprises an image captured by an image capturing device located on the vehicle while the vehicle is at the first location.

12. The computer-readable data storage device of claim 7, wherein the data points that indicate presence of a 3D object are generated by a data point device located on a first vehicle, and
wherein at least one image associated with a surface of the major 3DR comprises an image captured by an image capturing device located on a second vehicle.

13. The computer-readable data storage device of claim 7, wherein the stored images captured from any given location are arranged as an image bubble covering 360 degrees of viewpoints.

14. The computer-readable data storage device of claim 7, further comprising:
computer-readable program instructions executable by the processor to refer to the association data to identify the respective image associated with a surface of the major 3DR when that major 3DR is within an area to be displayed on the map,
and computer-readable program instructions that cause the surface of the major 3DR to be textured with the respective image when that surface of the major 3DR is displayed on the map.

15. The computer-readable data storage device of claim 7, wherein the 3D region is a rectangular prism.

16. A system for displaying a map with three-dimensional features, the system comprising:
a display device;
a user-input device;
a computer-readable data storage device; and
a processor that is operable to execute computer-readable program instructions stored at the computer-readable data storage device,
wherein the computer-readable data storage device comprises data that identifies a plurality of major three-dimensional regions (major 3DRs), each major 3DR comprising a top, a bottom, and multiple sides,
wherein the computer-readable data storage device comprises, for each identified major 3DR, data that identifies at least one respective surface for each side, top, and bottom of that major 3DR,
wherein the computer-readable data storage device comprises a plurality of images,
wherein at least a portion of each image is associated with a surface defined for a major 3DR, and each side, top, and bottom of the major 3DR is associated with a different image captured by a different vehicle-mounted camera,
wherein the computer-readable program instructions comprise program instructions executable to cause the display device to display at least one major 3DR in response to selection of a geographical location via the user-input device, and
wherein, when a given major 3DR is being displayed, each visible surface of the given major 3DR is textured with the image associated with that surface;
wherein the computer-readable data storage device comprises data that identifies at least one minor three-dimensional region (minor 3DR), each minor 3DR comprising a top, a bottom, and multiple sides, and having at least one respective surface defined for the top, the bottom, and each side of that minor 3DR,
wherein the computer-readable data storage device comprises data that associates each defined minor 3DR with a major 3DR of the plurality of major 3DRs,
wherein the computer-readable program instructions comprise program instructions executable to cause the display device to transition from displaying the given major 3DR to displaying each minor 3DR that is associated with the given major 3DR,
wherein, when a given minor 3DR is being displayed, each visible surface of the given minor 3DR is textured with the image associated with that surface,
wherein the data that identifies at least one minor 3DR comprises data that identifies multiple levels of minor 3DRs for the given minor 3DR, and
wherein each level of minor 3DRs for the given minor 3DR that is lower in resolution than another level of minor 3DR for the given minor 3DR comprises fewer defined three-dimensional regions than a number of defined three-dimensional regions for that other level of minor 3DR for the given minor 3DR.

17. The system of claim 16,
wherein each three-dimensional region defined for any level of minor 3DRS for the given minor 3DR comprises a top, a bottom, and multiple sides, and has at least one surface defined for the top, the bottom, and each side of that three-dimensional region,
wherein the computer-readable program instructions comprise program instructions executable to cause the display device to transition from displaying the given minor 3DR to a higher-resolution level of the given minor 3DR, and
wherein, when a given minor 3DR is being displayed, each visible surface of the given minor 3DR is textured with the image associated with that surface.

18. The system of claim 16, further comprising:
a communications interface that is operable to receive data points associated with the given minor 3DR, wherein the data points represent at least a portion of an object located at a location associated with the given minor 3DR.

19. The system of claim 18, wherein the data points associated with the given minor 3DR comprise Light Detection and Ranging (LIDAR) data points generated by a LIDAR device.

20. The system of claim 16,
wherein the plurality of images comprises satellite imagery captured by a satellite, wherein the display device displays at least one satellite image, associated with the geographical location selection entered via the user-input device, as a base image, and
wherein the at least one major 3DR displayed via the display device covers at least a portion of the base image.

21. The system of claim 16, wherein the plurality of images comprises images arranged as an image bubble having 360 degrees of images captured at a given location.

22. A method for displaying a map with three-dimensional features, the method comprising:
storing, within a non-transitory computer-readable data storage device, data that identifies a major three-dimensional region (major 3DR) and data that identifies at least a portion of an image that is associated with at least one surface defined for the three-dimensional region, wherein the major 3DR comprises images captured from a top, a bottom, and multiple sides of a vehicle, and wherein each top, bottom, and side of each major 3DR comprises at least one surface;
receiving computer-readable data indicating a selection of a given geographical location and responsively executing computer-readable program instructions to determine that the major 3DR is associated with a geographic area that includes the given geographical location;
providing data to display a map that depicts the geographical area and the major 3DR associated with the geographical area, wherein the at least one surface defined for the three-dimensional region is textured with the at least a portion of the image that is associated with that surface;
associating one or more sets of data points with a first major 3DR of the plurality of major 3DRs, wherein each set of data points associated with the first major 3DR indicates presence of one or more objects at points in space on or above the geographical area associated with the first major 3DR; and
defining one or more minor three-dimensional regions (minor 3DRs) for the first major 3DR, wherein each minor 3DR defined for the first major 3DR pertains to a portion of the first major 3DR at which a density of data points of a set of data points associated with the first major 3DR equals or exceeds a density threshold, wherein each minor 3DR defined for the first major 3DR comprises at least a top, a bottom, and multiple sides.

\* \* \* \* \*